United States Patent
Hayner et al.

(10) Patent No.: US 12,463,208 B2
(45) Date of Patent: Nov. 4, 2025

(54) THERMALLY DISPROPORTIONATED ANODE ACTIVE MATERIAL INCLUDING TURBOSTRATIC CARBON COATING

(71) Applicant: NANOGRAF CORPORATION, Chicago, IL (US)

(72) Inventors: Cary Hayner, Chicago, IL (US); Seonbaek Ha, Chicago, IL (US); Kathryn Hicks, Chicago, IL (US); Joshua Lau, Chicago, IL (US); Christine Frysz, Orchard Park, NY (US)

(73) Assignee: NANOGRAF CORPORATION, Chicago, IL (US)

( * ) Notice: Subject to any disclaimer, the term of this patent is extended or adjusted under 35 U.S.C. 154(b) by 0 days.

(21) Appl. No.: 18/309,342

(22) Filed: Apr. 28, 2023

(65) Prior Publication Data

US 2023/0361286 A1    Nov. 9, 2023

Related U.S. Application Data

(62) Division of application No. 17/090,307, filed on Nov. 5, 2020, now Pat. No. 11,670,763.

(Continued)

(51) Int. Cl.
*H01M 4/48* (2010.01)
*H01M 4/04* (2006.01)
(Continued)

(52) U.S. Cl.
CPC ........... *H01M 4/48* (2013.01); *H01M 4/0471* (2013.01); *H01M 4/1393* (2013.01);
(Continued)

(58) Field of Classification Search
CPC ........ H01M 4/48; H01M 4/04; H01M 4/1393; H01M 4/583; H01M 10/0525
See application file for complete search history.

(56) References Cited

U.S. PATENT DOCUMENTS 8,377,591 B2    2/2013  Miyachi et al.
8,551,650 B2   10/2013  Kung et al.
(Continued)

FOREIGN PATENT DOCUMENTS

CN    101350407 A    1/2009
CN    105280891 A    1/2016
(Continued)

OTHER PUBLICATIONS

Japan Patent Office Communication, Notice of Reasons of Rejection, for Japanese Patent Application No. 2022-525572, mailed Jan. 31, 2024, 7 pages.
(Continued)

*Primary Examiner* — Kenneth J Douyette
(74) *Attorney, Agent, or Firm* — THE MARBURY LAW GROUP PLLC

(57) ABSTRACT

An electrode material for a lithium ion secondary battery and method of forming the same, the electrode material including composite particles, each composite particle including a primary particle including thermally disproportionated silicon oxide, and an envelope disposed on the surface of the primary particle. The envelope includes turbostratic carbon having a Raman spectrum having: a D band having a peak intensity ($I_D$) at wave number between 1330 cm$^{-1}$ and 1360 cm$^{-1}$; a G band having a peak intensity ($I_G$) at wave number between 1530 cm$^{-1}$ and 1600 cm$^{-1}$; and a 2D band having a peak intensity ($I_{2D}$) at wave number between 2650 cm$^{-1}$ and 2750 cm$^{-1}$, wherein a ratio of $I_D/I_G$ (Continued)

ranges from greater than zero to about 1.0, and a ratio of $I_{2D}/I_G$ ranges from about 0.4 to about 2.

8 Claims, 11 Drawing Sheets

Related U.S. Application Data

(60) Provisional application No. 62/931,308, filed on Nov. 6, 2019.

(51) Int. Cl.
*H01M 4/1393* (2010.01)
*H01M 4/58* (2010.01)
*H01M 4/583* (2010.01)
*H01M 4/62* (2006.01)
*H01M 10/0525* (2010.01)

(52) U.S. Cl.
CPC ............ *H01M 4/583* (2013.01); *H01M 4/62* (2013.01); *H01M 4/623* (2013.01); *H01M 10/0525* (2013.01)

(56) References Cited

U.S. PATENT DOCUMENTS

| | | | |
|---|---|---|---|
| 9,601,768 | B2 | 3/2017 | Lim et al. |
| 10,804,530 | B2 | 10/2020 | McKinney et al. |
| 2006/0147797 | A1 | 7/2006 | Wu et al. |
| 2007/0224508 | A1 | 9/2007 | Aramata et al. |
| 2009/0047579 | A1* | 2/2009 | Jang ............... H01M 4/131 429/231.8 |
| 2010/0092809 | A1* | 4/2010 | Drzal ............... H01M 4/8882 977/890 |
| 2010/0176337 | A1 | 7/2010 | Zhamu et al. |
| 2011/0111303 | A1 | 5/2011 | Kung et al. |
| 2012/0171560 | A1 | 7/2012 | Xu et al. |
| 2012/0288750 | A1 | 11/2012 | Kung et al. |
| 2013/0004798 | A1 | 1/2013 | Huang et al. |
| 2013/0164612 | A1 | 6/2013 | Tanemura et al. |
| 2013/0230769 | A1 | 9/2013 | Xu |
| 2013/0344392 | A1 | 12/2013 | Huang et al. |
| 2014/0170485 | A1 | 6/2014 | Lee et al. |
| 2014/0322606 | A1 | 10/2014 | Lee et al. |
| 2015/0132644 | A1 | 5/2015 | Sonobe et al. |
| 2016/0372784 | A1 | 12/2016 | Hyaner et al. |
| 2017/0040599 | A1 | 2/2017 | Kamo et al. |
| 2017/0044128 | A1 | 2/2017 | Doll et al. |
| 2017/0141387 | A1 | 5/2017 | Hayner et al. |
| 2017/0151742 | A1 | 6/2017 | Hartmann |
| 2017/0187070 | A1 | 6/2017 | Park et al. |
| 2017/0271651 | A1 | 9/2017 | Behan et al. |
| 2019/0074508 | A1 | 3/2019 | Ha et al. |
| 2019/0190023 | A1 | 6/2019 | Kashitani |
| 2020/0373562 | A1 | 11/2020 | Lau et al. |
| 2021/0135209 | A1 | 5/2021 | Hayner et al. |

FOREIGN PATENT DOCUMENTS

| | | |
|---|---|---|
| CN | 107591518 A | 1/2018 |
| CN | 107710465 A | 2/2018 |
| EP | 2650950 A2 | 10/2013 |
| JP | 2004-327190 | 11/2004 |
| JP | 2007-294423 A | 11/2007 |
| JP | 2013-131486 | 7/2013 |
| JP | 2014-073942 A | 4/2014 |
| JP | 2017-004895 | 1/2017 |
| KR | 1020150128432 | 11/2015 |
| KR | 10-2016-0142788 A | 12/2016 |
| KR | 20180122871 A | 11/2018 |
| KR | 1020190030676 | 3/2019 |
| WO | WO2012-144177 A1 | 10/2012 |
| WO | WO2013/054481 A1 | 4/2013 |
| WO | WO 2015/107581 A1 | 7/2015 |
| WO | WO 2017/083804 A1 | 5/2017 |
| WO | WO 2018/074175 A1 | 4/2018 |
| WO | WO 2017/038320 A1 | 6/2018 |
| WO | WO2018-203599 A1 | 11/2018 |
| WO | WO2019016395 A1 | 1/2019 |
| WO | WO 2019/189747 A1 | 10/2019 |

OTHER PUBLICATIONS

IPRP—Notification Concerning Transmittal of International Preliminary Report on Patentability and Written Opinion of the International Searching Authority for International Patent Application No. PCTU/US2017/039416, mailed Feb. 13, 2020, 9 pages.

IPRP—Notification Concerning Transmittal of the International Preliminary Report on Patentability and the Written Opinion of the International Searching Authority for International Patent Application No. PCTUS2020/059048, mailed on May 19, 2022, 7 pages.

ISR—International National Preliminary Report on Patentability and Written Opinion of the International Searching Authority for International Patent Application No. PCTU/US2017/039416, mailed Jan. 24, 2019, 11 pages.

ISR—Notification of Transmittal of the International Search Report and the Written Opinion of the International Searching Authority for International Patent Application No. PCTUS2021/059048, mailed on Jul. 22, 2021, 9 pages.

Habibi, A. et al. "Fast synthesis of turbostratic carbon thin coating by cathodic plasma electrolysis," Thin Solid Films, 2017, vol. 621, pp. 253-258; https://doi.org/10.1016/j.tsf.2016.05.036.

Kim, H. et al., "Recent Advances in the Si-Based Nanocomposite Materials as High Capacity Anode Materials for Lithium ion Batteries", Materials Today, 2014, vol. 17, No. 6, pp. 285-297, (2014).

Lee, J.I. et al., "High-performance Silicon-based Multicomponent Battery Anodes Produced via Synergistic Coupling of Multifunctional Coating Layers", Energy & Environmental Science, vol. 8, No. 7, pp. 2075-2084, (2015).

Lee, J.K. et al., "Silicon Nanoparticles-Graphene Paper Composites for Li Ion Battery Anodes," Chem. Commun., vol. 46, (2010) pp. 2025-2027.

Luo, W. et al., "Surface and Interface Engineering of Silicon-Based Anode Materials for Lithium-ion Batteries", Advanced Energy Materials, 2017 (Abstract Only), vol. 7, No. 24, pp. 1-28, Article No. 1701083, (2017).

Nguyen, C.C. et al., "Roles of Oxygen and Interfacial Stabilization of in Enhancing the Cycling Ability of Silicon Oxide Anodes for Rechargeable Lithium Batteries," Journal of the Electrochemical Society, 160 (6) A906-A914 (2013).

Park, C.-M. et al. "Characterizations and electrochemical behaviors of disproportionated SiO and its composite for rechargeable Li-ion batteries," Journal of Materials Chemistry, 2010, vol. 20, issue 23, pp. 4854-4860; https://doi.org/10.1039/B923926J.

Sim, S. et al., "Critical Thickness of SiO2 Coating Layer on Core@Shell Bulk@Nanowire Si Anode Materials for Li-Ion Batteries," Adv. Mater. 2013, 25, 4498-4503.

He, Y.S. et al., "A Novel Bath Lily-like Graphene Sheet-Wrapped Nano-Si Composite as a High Performance Anode Material for Li-ion Batteries," RSC Advances, 2011, vol. 1, pp. 958-960, (2011). http://ro.uow.edu.au/scipapers/3470.

He, Y.S. et al., "A Novel Bath Lily-like Graphene Sheet-Wrapped Nano-Si Composite as a High Performance Anode Material for Li-ion Batteries," Electronic Supplementary Material (ESI) for RSC Advances, The Royal Society of Chemistry 2011, pp. 1-6, (2011).

KIPO Notification of Preliminary Rejection (Office Action) for Korean Patent Application No. 10-2022-7016694, mailed Jan. 2, 2024, 7 pages.

Mera, G. et al., "Polymer-derived SiCN and SiOC ceramics—structure and energetics at the nanoscale," Journal of Materials Chemistry A, vol. 1, pp. 3826-3826, (2013).

European Patent Office Communication, Extended European Search Report, for European Patent Application No. 20910524.6, mailed Feb. 26, 2024, 9 pages.

(56) References Cited

OTHER PUBLICATIONS

First Office Action from China National Intellectual Property Administration ("CNIPA") for PRC (China) Patent Application No. 202080084386.2, mailed Dec. 4, 2024, 15 pages including English-language translation.

China National Intellectual Property Administration ("CNIPA") Second Office Action for PRC (China) Patent Application No. 202080084386.2, dated Jun. 10, 2025, 9 pages including Machine English-language translation.

\* cited by examiner

| Half Cell Evaluation 1.5 – 0.02 V | Specific Capacity (mAh/g) | 1st CE (0.02 – 1.5V) (%) | Cycles to 80% capacity |
|---|---|---|---|
| Low Defect Turbostratic Carbon | 1550 | 76% | 98 |
| Reduced Graphene Oxide | 1580 | 73% | 57 |

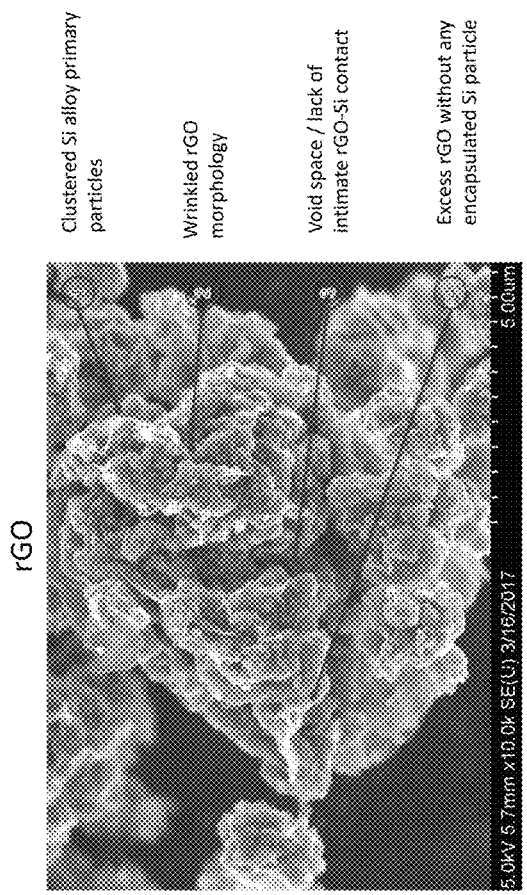

rGO

- Clustered Si alloy primary particles
- Wrinkled rGO morphology
- Void space / lack of intimate rGO-Si contact
- Excess rGO without any encapsulated Si particle

FIG. 12A

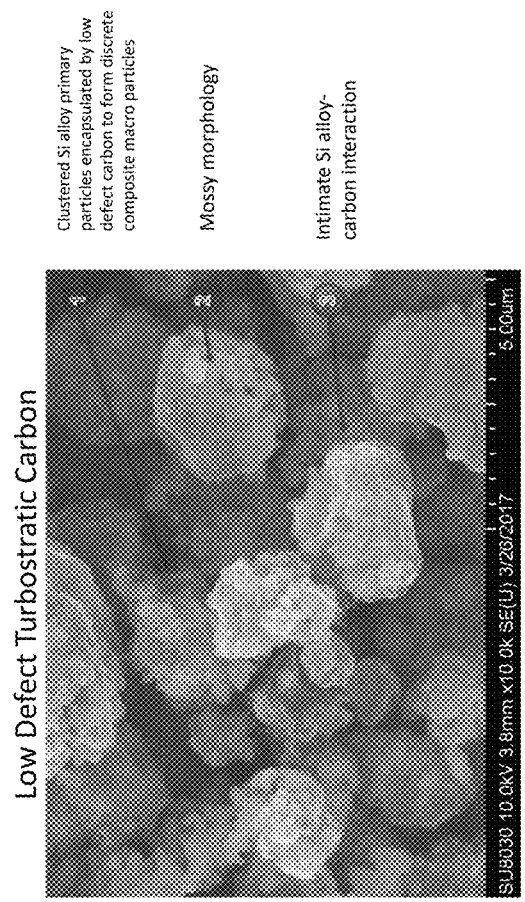

Low Defect Turbostratic Carbon

- Clustered Si alloy primary particles encapsulated by low defect carbon to form discrete composite macro particles
- Mossy morphology
- Intimate Si alloy-carbon interaction

FIG. 12B

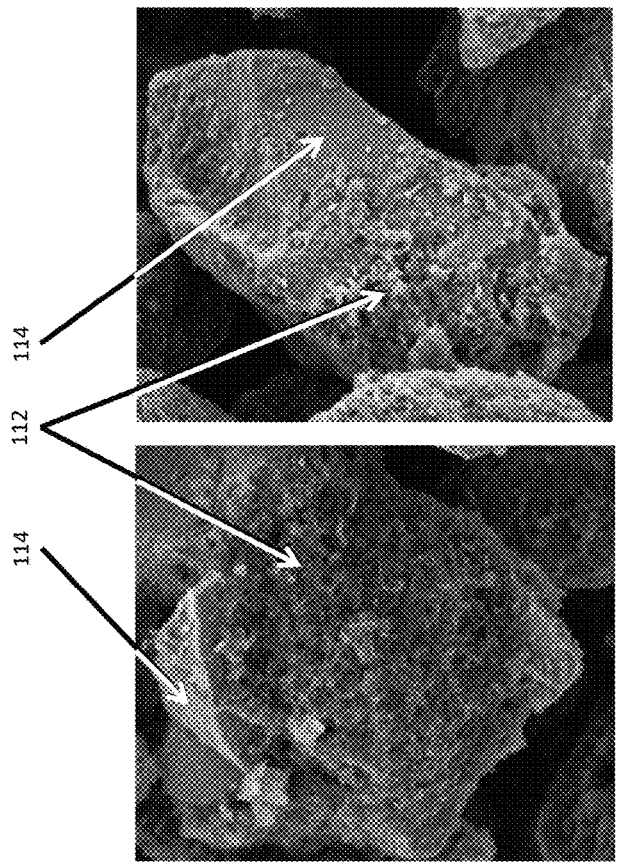
FIG. 13C
FIG. 13D
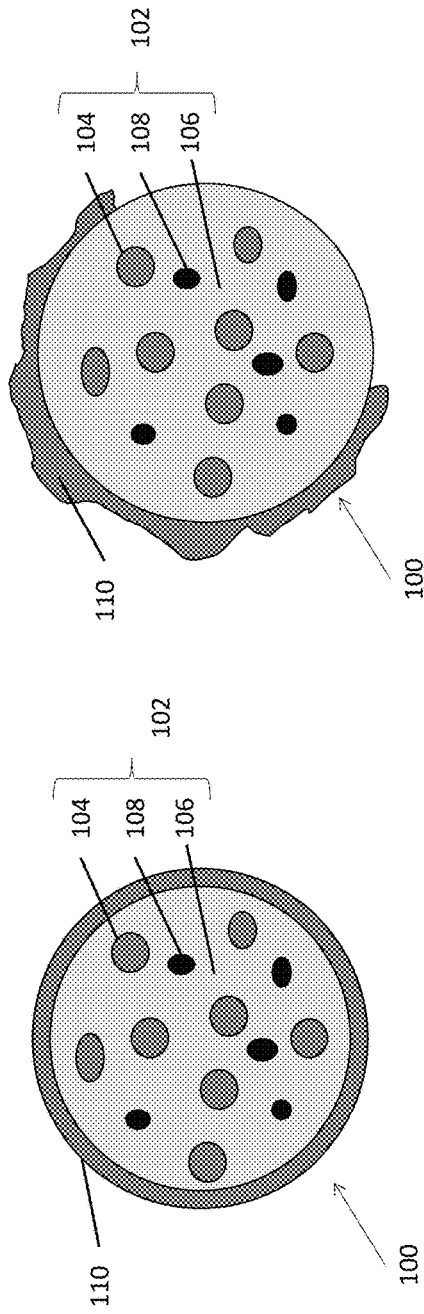
FIG. 14A
FIG. 14B

THERMALLY DISPROPORTIONATED ANODE ACTIVE MATERIAL INCLUDING TURBOSTRATIC CARBON COATING

TECHNICAL FIELD

This invention relates to anode active materials for electrochemical cells, and more particularly, to an advanced anode active material for use in a secondary lithium ion electrochemical cell, the anode active material comprising composite particles comprising thermally disproportionated primary particles coated with a low-defect turbostratic carbon material.

BACKGROUND

Lithium (Li) ion electrochemical cells typically require materials that enable high energy density, high power density and high cycling stability. Li ion cells are commonly used in a variety of applications, which include consumer electronics, wearable computing devices, military mobile equipment, satellite communication, spacecraft devices and electric vehicles, and are particularly popular for use in large-scale energy applications such as low-emission electric vehicles, renewable power plants, and stationary electric grids. Additionally, lithium-ion cells are at the forefront of new generation wireless and portable communication applications. One or more lithium ion cells may be used to configure a battery that serves as the power source for any of these applications. It is the explosion in the number of higher energy demanding applications, however, that is accelerating research for yet even higher energy density, higher power density, higher-rate charge-discharge capability, and longer cycle life lithium ion cells. Additionally, with the increasing adoption of lithium-ion technology, there is an ever increasing need to extend today's energy and power densities, as applications migrate to higher current needs, longer run-times, wider and higher power ranges and smaller form factors.

Silicon or silicon alloy anode materials are currently included in most long-term lithium-ion technology adoption roadmaps as a practical means to achieve higher energy and power densities. Silicon is a desirable negative electrode active material for lithium ion electrochemical cell applications having a theoretical gravimetric capacity of about 4,200 mAh/g and volumetric capacity of about 9786 mAh/cm$^3$ when fully lithiated. Silicon is also a desirable replacement for current graphite-based anodes as its high lithium storage capacity can exceed 7× that of graphite. Market adoption of silicon-based anodes for use in lithium ion cells, however, has been challenged by rapid cycle life degradation, poor charge-discharge rate capability under high power demands, and subpar or deficient coulombic efficiency, all of which may result from extreme anode volume changes during charge and discharge (volume expansions of up to 400% have been noted). Cycle life degradation in silicon-based alloys is well understood, and can be broken down into two fundamental mechanisms: (1) electrical disconnection, and (2) unstable solid electrolyte interface (SEI) resulting in lithium ion consumption and impedance growth. High rate capability and coulombic efficiency are also compromised by these mechanisms. Electrical disconnection occurs with significant volume fluctuations during charge and discharge due to large volume changes upon lithiation and delithiation.

These large volume changes may cause pulverization (stress-induced cracking and fracture) of the silicon particles and loss of electrical contact between these active silicon particles. The result is an electrochemical cell having low power capability and rapid capacity fade. The cracking and fracture introduced in mechanism (1) further worsens cell performance by subsequently promoting mechanism (2), an unstable SEI. Because cracking and fracture expose new Si surfaces to the electrolyte solvents, further SEI formation occurs, depositing lithiated compounds on the new Si surfaces. During charge/discharge cycling, the insulating SEI layer also grows thicker, further degrading the capacity and cycling stability of the Si anode, and compromising charge/discharge rate capability and coulombic efficiency.

Continuous and new growth of the SEI layer gradually deplete the available Lit and, due to side reactions with the electrolyte solvent and salt(s), the amount of serviceable electrolyte is depleted as well, thereby deteriorating overall electrochemical cell performance. The use of silicon-based anodes in applications requiring high electrochemical cell charge/discharge rates, therefore, is severely limited resultant from the high ohmic and ionic contributions to polarization resulting from these mechanisms.

Improving the cycling stability of high specific capacity silicon or silicon alloy anodes has been a topic of development for decades. Various approaches have been taken regarding silicon anode cycle life stabilization, such as, but not limited to, (i) anode particle structure, (ii) particle size control, (iii) particle surface coating or encapsulation, (iv) composite particle composition and/or structure, (v) void space engineering, and (vi) carbon-containing anode composite material mixture. Utilizing variants of carbon has been one of the most popular methods of stabilizing silicon alloy anode cycle life, due to carbon's favorable physical and electrochemical properties. Carbon additions to composite anode material mixtures have been shown to be useful in providing a silicon-based anode with a conductive network and/or matrix that buffers volume expansion during lithiation and delithiation. Moreover, nano carbon materials having limited atomic layers, from one to a few, have been shown to be particularly beneficial to silicon-based anodes for their ability to sustain intimate contact with silicon particles during volume expansion and contraction. Carbon materials, such as graphite, graphene, graphene oxide, reduced graphene oxide, exfoliated graphite or graphene, graphene nanoplatelets or nanoparticles, nanoplatelets or nanoparticles comprising platelets comprising one or more graphene layers, carbon nanotubes (CNTs) such as single walled, double walled or multi-walled CNT, have all shown, independently or in combination, to be a beneficial addition to electrode material mixtures.

It is well established that the quality of graphene highly depends on the manufacturing and processing conditions when fabricated. For example, the defect density in graphene nanosheets via graphene oxide can be heavily impacted by various modifications to the Hummers' production method and subsequent reduction processes. The effect of graphene quality on the performance of battery electrodes, however, has yet to be fully characterized. For example, the effects of carbon material defect density and/or lattice stacking on electrochemical cell performance is substantially lacking. Historically, a scanning electron microscope (SEM) has typically been a first option to observe the morphology of Si/graphene composites. However, the thickness and number of layers of graphene and defect density cannot be properly quantified due to the limitations of SEM imaging. A transmission electron microscope (TEM) has been applied to investigate the crystal structure of Si/graphene nanocomposites. By adjusting the contrast of a TEM image, a graphene sheet can be isolated from Si/graphene nanocomposites due to its thin thickness and relatively low atomic weight, however, determining number of layers and defining defect density is still difficult. An atomic force microscope (AFM) has been utilized to measure thickness of graphene nanosheets. Many fabricated Si/graphene nanocomposites have been shown to have graphene thickness of less than 10 nm; however, AFM is unable to determine graphene thickness or defect characteristics.

Accordingly, there is a need for an advanced anode material mixture for use in an electrochemical cell that incorporates carbon materials of defined quality characteristics that favorably impact electrochemical cell cyclability. More specifically, there is a need for advanced silicon-based anode mixture compositions that comprise low-defect turbostratic carbons that enable lithium ion electrochemical cell cycle life stability, energy density, and rate performance.

SUMMARY

According to various embodiments of the present disclosure, provided is an electrode material comprising composite particles, each composite particle comprising: a primary particle comprising thermally disproportionated silicon oxide; and an envelope disposed on the surface of the primary particle, the envelope comprising turbostratic carbon having a Raman spectrum having: a D band having a peak intensity ($I_D$) at wave number between 1330 cm$^{-1}$ and 1360 cm$^{-1}$; a G band having a peak intensity ($I_G$) at wave number between 1530 cm$^{-1}$ and 1580 cm$^{-1}$; and a 2D band having a peak intensity ($I_{2D}$) at wave number between 2650 cm$^{-1}$ and 2750 cm$^{-1}$, wherein: a ratio of $I_D/I_G$ ranges from greater than zero to about 0.8; and a ratio of $I_{2D}/I_G$ ranges from about 0.5 to about 2.

According to various embodiments, an electrode material for a lithium ion secondary battery, the electrode material comprising composite particles, each composite particle comprising: a primary particle comprising thermally disproportionated, metalized (e.g., metal-doped), silicon oxide; and an envelope disposed on the surface of the primary particle, the envelope comprising turbostratic carbon having a Raman spectrum having: a D band having a peak intensity ($I_D$) at wave number between 1330 cm$^{-1}$ and 1360 cm$^{-1}$; a G band having a peak intensity ($I_G$) at wave number between 1580 cm$^{-1}$ and 1600 cm$^{-1}$; and a 2D band having a peak intensity ($I_{2D}$) at wave number between 2650 cm$^{-1}$ and 2750 cm$^{-1}$, wherein: a ratio of $I_D/I_G$ ranges from greater than zero to about 1.1; and a ratio of $I_{2D}/I_G$ ranges from about 0.4 to about 2.

According to various embodiments of the present disclosure, the envelope comprising a low-defect, turbostratic carbon that comprises graphene layers that partially overlap one another on the surface of the primary particle to simulate larger single-sheet structures. In some embodiments the turbostratic carbon may be in the form of platelets having one or more than one layers of graphene. In some embodiments, the turbostratic carbon has a low thickness. In some embodiments, the turbostratic carbon is crumpled resembling a crumpled ball-like structure. In some embodiments, the turbostratic carbon wraps around or is bonded to particles of an electrode material.

According to various embodiments of the present disclosure, provided is a method of forming an anode material, the method comprising: thermally disproportionating SiO$_x$ particles, wherein x ranges from about 0.7 to about 1.1, to form primary particles comprising crystalline Si domains disposed in a matrix comprising SiO$_2$; forming a mixture comprising the primary particles and graphene; and coating the primary particles with graphene to form composite particles.

According to various embodiments of the present disclosure, provided is a method of forming an anode material, the method comprising: forming a mixture comprising graphene and SiO$_x$ particles, wherein x ranges from about 0.7 to about 1.1; coating the primary particles with graphene to form a composite powder; and thermally disproportionating the powder to form composite particles. Each of the composite particles comprises a primary particle comprising crystalline Si domains disposed in a matrix comprising SiO$_2$, and an envelope disposed on the primary particle and comprising graphene.

Other principal features and advantages of the invention will become apparent to those skilled in the art upon review of the following drawings, the detailed description, and the appended claims.

BRIEF DESCRIPTION OF THE DRAWINGS

FIG. 12A is a scanning electron microscope (SEM) image of a composite particle comprising SiO$_x$ primary particles encapsulated by reduced graphene oxide.

FIG. 12B is a scanning electron microscope (SEM) image of composite particles comprising SiO$_x$ primary particles encapsulated by a low-defect turbostratic carbon.

FIGS. 13A-13D are micrographs showing composite particles, according to various embodiments of the present disclosure.

FIGS. 14A and 14B are sectional, schematic views respectively illustrating thermally disproportionated composite electrode material particles 100, according to various embodiments of the present disclosure.

DETAILED DESCRIPTION OF THE PREFERRED EMBODIMENTS

Figure 1C:
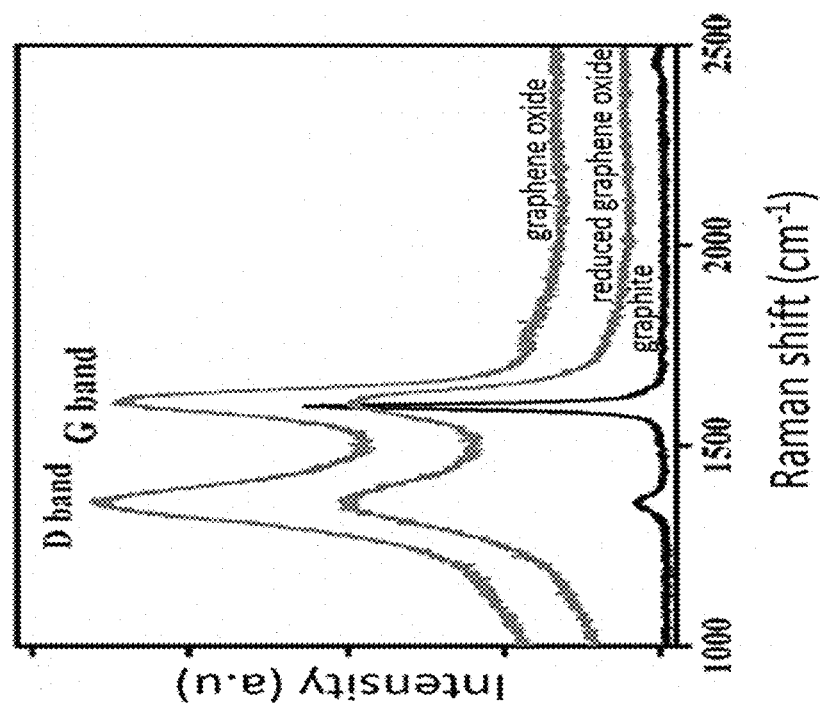
FIGS. 1A, 1B and 1C illustrate Raman spectra for graphite and various graphene-based materials.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. It will also be understood that the term "about" may refer to a minor measurement errors of, for example, +/−5% to 10%.

Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

An "electrode material" is defined as a material that may be configured for use as an electrode within an electrochemical cell, such as a lithium ion rechargeable battery. An "electrode" is defined as either an anode or a cathode of an electrochemical cell. A "composite electrode material" is also defined to include active material particles combined with one of particles, flakes, spheres, platelets, sheets, tubes, fibers, or combinations thereof and that are of an electrically conductive material. The particles, flakes, spheres, platelets, sheets, tubes, fibers or combinations thereof may further be one of flat, crumpled, wrinkled, layered, woven, braided, or combinations thereof. The electrically conductive material, may be selected from the group consisting of an electrically conductive carbon-based material, an electrically conductive polymer, graphite, a metallic powder, nickel, aluminum, titanium, stainless steel, and any combination thereof. The electrically conductive carbon-based material may further include one of graphite, graphene, diamond, pyrolytic graphite, carbon black, low defect turbostratic carbon, fullerenes, or combinations thereof. An "electrode material mixture" is defined as a combination of materials such as: material particles (either electrochemically active, electrically conductive, composite or combinations thereof), a binder or binders, a non-crosslinking and/or a crosslinking polymer or polymers, which are mixed together for use in forming an electrode for an electrochemical cell. An "electrochemically active material", "electrode active material" or "active material" is defined herein as a material that inserts and releases ions such as ions in an electrolyte, to store and release an electrical potential. The term "inserts and releases" may be further understood as ions that intercalate and deintercalate, or lithiate and delithiate. The process of inserting and releasing of ions is also understood, therefore, to be intercalation and deintercalation, or lithiation and delithiation. An "active material" or an "electrochemically active material" or an "active material particle", therefore, is defined as a material or particle capable of repeating ion intercalation and deintercalation or lithium lithiation and delithiation.

A "defect" is defined as any feature that disrupts the symmetry of the hexagonal lattice of carbon atoms in a given sheet of carbon. In accordance with this definition, a defect may include vacancies, substitutional atoms, edges, grain boundaries or changes to the carbon-hybridization. "Hybridization" is the mixing of standard atomic orbitals to form new orbitals, which can be used to describe bonding in molecules. Mixing of standard atomic orbitals commonly occurs with $sp^2$ and $sp^3$ orbitals.

Defect density is defined as the quantity of symmetry breaking features (defects) in a given unit area of a carbon plane. This value is often estimated as the mean distance between two defects. Defect density can be approximated with Raman spectroscopy using the ratio of $I_D/I_G$.

A "composite particle" may comprise a primary particle or core comprising an electrochemically active material and an envelope disposed on the surface of the primary particle. The envelope may comprise turbostratic carbon.

According to various embodiments of the present disclosure, the primary particles are at least partially encapsulated (e.g., covered) by the envelope. For example, the envelopes and/or the turbostratic carbon may cover, on average, from about 10% to about 100%, such as from about 20% to about 90%, from about 25% to about 80%, from about 30% to about 70%, or from about 40% to about 60% of the surface of each primary particle.

An "envelope" may be a capsule or shell that at least partially covers, encloses, or encapsulates a core material such as at least one primary particle. The primary may comprise an electrochemically active material, such as metalloid or metal oxide material that is capable of yielding reversible lithium storage capacity. In some embodiments, the envelope may have a crumpled morphology. The term "crumpled" is defined as a body or mass displaying a distribution of creases, ripples, folds, wrinkles, and ridges. The term "crumpled" is also defined as to make or become curved. The term "morphology" is defined as a structure and feature or features of a surface. Specifically, "morphology" is the structure and features of the exterior surface of a particle or a macroparticle of an electrode material.

As defined herein a "secondary" electrochemical cell is an electrochemical cell or battery that is rechargeable. "Capacity" is defined herein as a measure of charge stored by a battery as determined by the mass of active material contained within the battery, representing the maximum amount of energy, in ampere-hours (Ah), which can be extracted from a battery at a rated voltage. Capacity may also be defined by the equation: capacity=energy/voltage or current (A)×time (h). "Energy" is mathematically defined by the equation: energy=capacity (Ah)×voltage (V). "Specific capacity" is defined herein as the amount of electric charge that can be delivered for a specified amount of time per unit of mass or unit of volume of active electrode material. Specific capacity may be measured in gravimetric units, for example, (Ah)/g or volumetric units, for example, (Ah)/cc. Specific capacity is defined by the mathematical equation: specific capacity (Ah/kg)=capacity (Ah)/mass (kg). "Rate capability" is the ability of an electrochemical cell to receive or deliver an amount of energy within a specified time period. Alternately, "rate capability" is the maximum continuous or pulsed energy a battery can provide per unit of time.

"C-rate" is defined herein as a measure of the rate at which a battery is discharged relative to its maximum nominal capacity. For example, a 1C current rate means that the discharge current will discharge the entire battery in 1 hour; a C/2 current rate will completely discharge the cell in 2 hours and a 2C rate in 0.5 hours. "Power" is defined as the time rate of energy transfer, measured in Watts (W). Power is the product of the voltage (V) across a battery or cell and the current (A) through the battery or cell. "C-Rate" is mathematically defined as C-Rate (inverse hours)=current (A)/capacity (Ah) or C-Rate (inverse hours)=1/discharge time (h). Power is defined by the mathematical equations: power (W)=energy (Wh)/time (h) or power (W)=current (A)×voltage (V). Coulombic efficiency is the efficiency at which charge is transferred within an electrochemical cell. Coulombic efficiency is the ratio of the output of charge by a battery to the input of charge.

The present application discloses, among other things, a composite particle comprising an active material and a low-defect turbostratic carbon. Further disclosed is a composite electrode material, an electrochemical cell and relate processes therefor. The low-defect turbostratic carbon material may comprise an element of one of the group consisting of: a particle structure, a particle structure having an active material particle as a first component, an electrode material, an electrode, an electrochemical cell, and combinations thereof. The low-defect turbostratic carbon provides improved cycling stability and high rate performance compared to other carbon-based materials used in an electrochemical cell. Specifically, a low-defect low thickness turbostratic graphene and methods therefor, when incorporated as an element of a structure used in an electrochemical cell provides superior performance of said electrochemical cell compared with other electrochemical cells using other carbon materials.

Raman spectroscopy is a technique used to observe vibrational, rotational, and other low-frequency modes in a system. Raman spectroscopy is commonly used in chemistry to provide a structural fingerprint by which molecules can be identified. The technique relies on inelastic scattering, or Raman scattering, of monochromatic light, usually from a laser in the visible, near infrared, or near ultraviolet range. The laser light interacts with molecular vibrations, phonons or other excitations in the system, resulting in the energy of the laser photons being shifted up or down. The shift in energy gives information about the vibrational modes in the system. Raman spectroscopy thereby allows the identification and characterization of carbon-based materials, ranging from very well organized carbons such as four coordinated diamond; to three coordinated aromatic carbons such as graphene, nanotubes, nanoplatelets, nanocones and nanoribbons, down to amorphous carbons. Multi-wavelength Raman spectroscopy has proven to be a very powerful non-destructive tool for the characterization of such carbons. Depending on the material studied, some specific spectroscopic parameters (e.g., band position, full width at half maximum, relative intensity ratio between two bands) are used to characterize defects.

The sp2 hybridized carbons constitute a broad class of solid phases composed primarily of elemental carbon and can be either synthetic or naturally occurring. Some non-limiting examples are graphite, graphene, carbon nanotubes, and pyrolytic carbon. These carbons may vary from highly ordered or crystalline to completely disordered or amorphous solids and detailed knowledge of their internal structure and composition is of utmost importance for the scientific and engineering electrochemical cell communities working with these materials.

Interestingly, graphene, being the fundamental building block for all graphitic materials, currently has no universal standard material definition as it relates to its use in electrochemical cells. As a result of this lack of scientific clarity, many forms of graphene or graphene-like materials have been used as electrode additives, including, but not limited to, monolayer graphene, few-layer graphene, multi-layer graphene, carbon nanoribbons, and carbon nanoplatelets, graphene oxide, and reduced graphene oxide. Confusingly, all of these materials are often vaguely labeled in scientific and legal publications as graphene despite not adhering to the scientific definition of graphene. Because this standard definition for an electrochemical cell graphene material or a group of graphene materials does not exist, choosing the correct graphene-like carbon material suitable for use as additives to electrochemical cell active material mixtures is currently challenging.

Graphene is a material of interest for use in electrochemical cells as graphene is an extremely efficient conductor of electrical and thermal energy. Graphene is also lightweight, chemically inert, and flexible. Because graphene, however, is produced using a number of processes, electrochemical cell performance results have been varied, and often disappointing. Non-limiting processes for producing graphene include mechanical cleavage, epitaxial growth, chemical vapor deposition, and chemical or mechanical exfoliation. Since so many different processes can be used to make a graphene or graphene-like product, it is expected that the graphene may contain a number of carbon species within, may have unwanted by-products which are remnants of the process, may have potentially detrimental structural damage resulting from the process or combinations thereof.

The Raman spectra of all carbon systems show some prominent features regardless of the final structure, whether the final structure is a conjugated polymer or a fullerene. Moreover, carbon system spectra characteristically display intense bands in the 1000-2000 $cm^{-1}$ region, in addition to a few other second-order modulations that appear in the spectrum. The shape, intensity and positions of the peaks in the spectrum allow differentiation between, for example, a hard amorphous carbon, from a carbon nanotube.

Figure 1B:
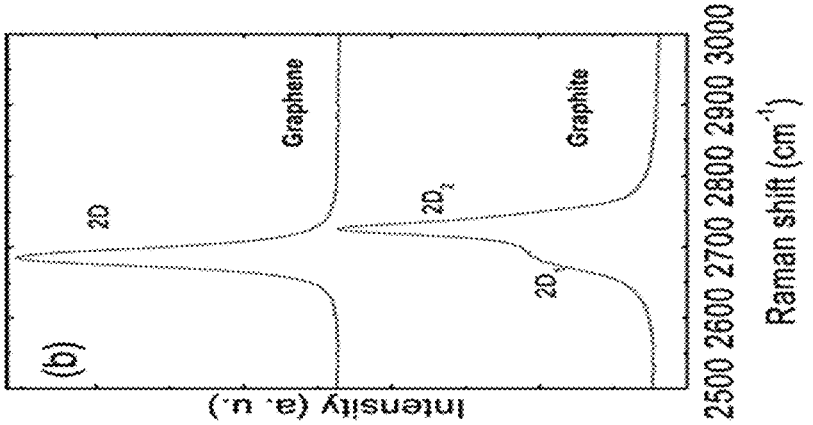
Figure 1A:
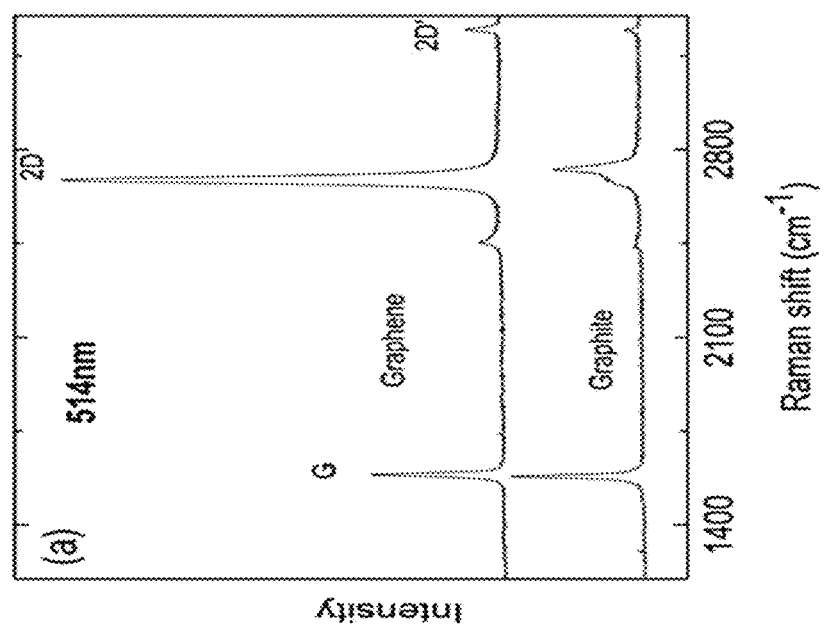

FIGS. 1A, 1B and 1C illustrate Raman spectra for graphite and various graphene-based materials. It has been well established that graphite and graphene materials have characteristic peaks at approximately 1340 $cm^{-1}$, 1584 $cm^{-1}$ and 2700 $cm^{-1}$. The peak at 1340 $cm^{-1}$ is shown in FIG. 1C, and is characterized as the D band. The peak at 1584 $cm^{-1}$ is shown in the spectra of FIGS. 1A and 1C, and is characterized as the G band, which results from the vibrational mode represented by the C—C bond stretching of all pairs of $sp^2$ hybridized carbon atoms. The D band originates from a hybridized vibrational mode associated with graphene edges and it indicates the presence of defects or broken symmetry in the graphene structure. The peak at 2700 cm$^{-1}$ is shown in FIG. 1B, and is characterized as the 2D band, which results from a double resonance process due to interactions between stacked graphene layers. The emergence of a double peak at the 2D wavenumber breaks the symmetry of the peak, and is indicative of AB stacking order between graphene planes in graphite and graphite derivatives such as nanoplatelets. The $2D_1$ peak shown in FIG. 1B becomes suppressed when the AB stacking order in turbostratic multilayer graphene particles is disrupted. The positions of the G and 2D bands are used to determine the number of layers in a material system. Hence, Raman spectroscopy provides the scientific clarity and definition for electrochemical cell carbon material additives, providing a fingerprint for correct selection as additives for active material electrode compositions. As will be shown, the present definition provides that fingerprint for the low-defect turbostratic carbon of the present application. It is this low-defect turbostratic carbon when used as an additive to an electrochemical cell electrode active material mixture that provides superior electrochemical cell performance.

Turbostratic Carbon

Figure 2:
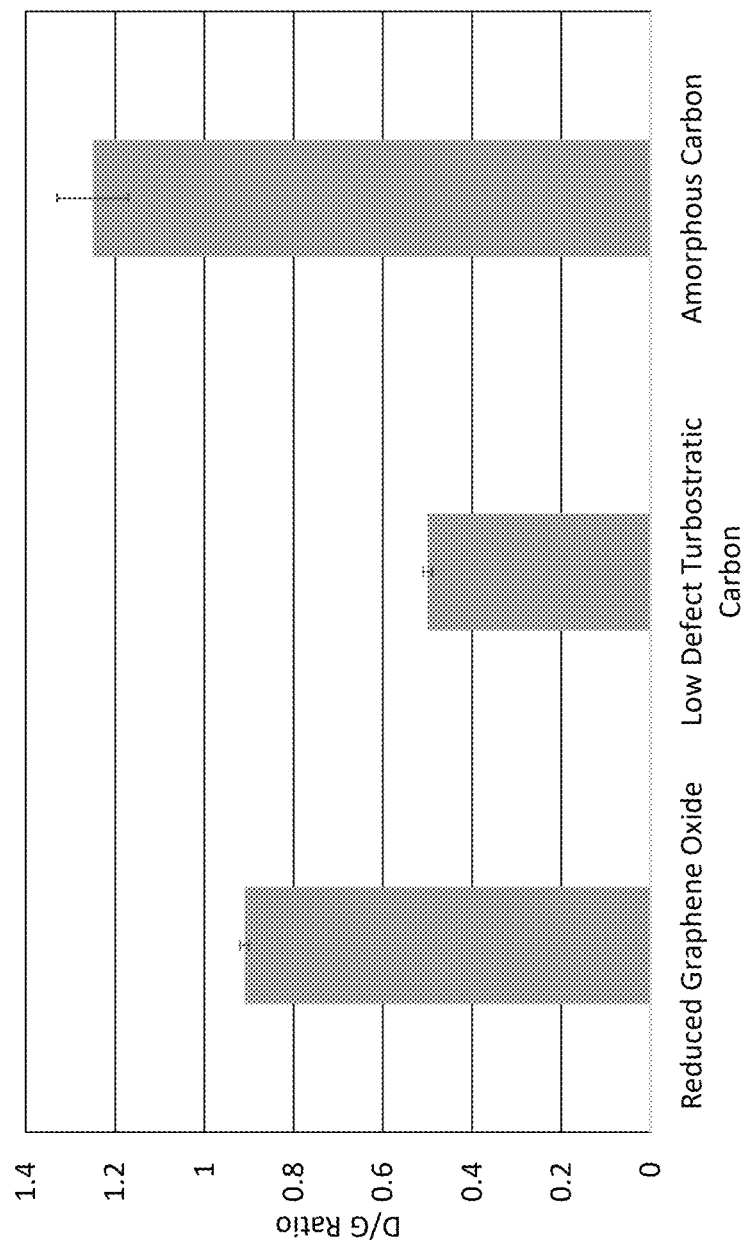
FIG. 2 is a bar chart comparing the Raman spectra $I_D/I_G$ ratios of typical carbon materials to low-defect turbostratic carbon.

FIG. 2 provides the $I_D/I_G$ ratio of carbon additives typically used in prior art electrode active material mixtures (i.e., reduced graphene oxide or amorphous carbon) compared with the low-defect turbostratic carbon of the present application.

Reduced graphene oxide (rGO) is a carbon variant that is often referred to as graphene in the industry, however, is unique in final structure and manufacturing process. Graphene oxide is typically manufactured first using a modified Hummers method wherein a graphite material is oxidized and exfoliated into single layers or platelets comprising a few layers of carbon that may comprise various functional groups, including, but not limited to, hydroxyls, epoxides, carbonyls, and carboxyls. These functional groups are then removed through chemical or thermal treatments that convert the insulating graphene oxide into conductive reduced graphene oxide. The reduced graphene oxide is similar to graphene in that it consists of single layers of carbon atom lattices, but differs in that it has mixed sp2 and sp3 hybridization, residual functional groups and often increased defect density resultant from the manufacturing and reduction processes. Reduced graphene oxide is shown in the first bar of FIG. 2 and has an $I_D/I_G$ ratio of 0.9.

Amorphous carbon is often used as an additive or surface coating for both electrochemical cell anode and cathode material mixtures to enhance electrode conductivity. Typically, amorphous carbons are produced using a chemical vapor deposition (CVD) process wherein a hydrocarbon feedstock gas is flowed into a sealed vessel and carbonized at elevated temperatures onto the surface of a desired powder material. This thermal decomposition process can provide thin amorphous carbon coatings, on the order of a few nanometers thick, which lack any sp2 hybridization as found in crystalline graphene-based materials. Amorphous carbon is shown in the third bar of FIG. 2 and has an $I_D/I_G$ ratio >1.2.

Low-defect turbostratic carbon, also referred to as graphene, comprises unique characteristics resultant from its manufacturing processing. One common method of producing this material is through a plasma based CVD process wherein a hydrocarbon feedstock gas is fed through an inert gas plasma in the presence of a catalyst that can nucleate graphene-like carbon structures. By controlling the production parameters, carbon materials having a few layers and absent any AB stacking order between lattices can be produced. These carbon materials are typically highly ordered sp2 carbon lattices with low-defect density.

The low-defect turbostratic carbon of the present disclosure is shown in the center second bar of FIG. 2. The Raman spectrum of the low-defect turbostratic carbon additive of the present application is derived from the intensity ratio of the D band and the G band ($I_D/I_G$) and the intensity ratio of the 2D band and the G band ($I_{2D}/I_G$). The $I_D$, $I_{2D}$, and $I_G$ are represented by their respective integrated intensities. A low $I_D/I_G$ ratio indicates a low-defect material. In some embodiments, the low-defect turbostratic carbon material has an $I_D/I_G$ ratio of greater than zero and less than or equal to about 1.1, such as from greater than zero to about 1, from greater than zero to about 0.9, or from greater than zero to about 0.85, as determined by Raman spectroscopy with $I_G$ at wavenumber in a range between 1530 and 1600 cm$^{-1}$, in a range from about 1580 cm$^{-1}$ to about 1600 cm$^{-1}$, or in a range between 1530 and 1584 cm$^{-1}$, with $I_D$ at wavenumber in a range between 1330 and 1360 cm$^{-1}$, and being measured using an incident laser wavelength of 532 nm. In one embodiment, the low-defect turbostratic carbon material of the present invention has an $I_D/I_G$ ratio of greater than zero and less than or equal to about 0.8, as determined by Raman spectroscopy with $I_G$ at wavenumber in a range between 1530 and 1580 cm$^{-1}$, $I_D$ at wavenumber in a range between 1330 and 1360 cm$^{-1}$, and being measured using an incident laser wavelength of 532 nm. Additionally, the low-defect turbostratic carbon material of the present disclosure exhibits an $I_{2D}/I_G$ ratio of about 0.4 or more, such as 0.5 or more. As reference regarding the $I_{2D}/I_G$ ratio, an $I_{2D}/I_G$ ratio of approximately 2 is typically associated with single layer graphene. $I_{2D}/I_G$ ratios of less than about 0.5 is usually associated with bulk graphite consisting of a multitude of AB stacked graphene layers. Hence, the $I_{2D}/I_G$ ratio of about 0.5 or more, for the low-defect turbostratic carbon material of the present disclosure, indicates a low layer count of ≤10. In some embodiments, the low-defect turbostratic carbon may have an $I_{2D}/I_G$ ratio that ranges from about 0.4 to about 2, or from about 0.5 to about 2. The low-defect turbostratic carbon material of low layer count further lacks an AB stacking order between graphene layers (i.e., turbostratic). The turbostratic nature or lack of AB stacking of these graphene planes is indicated by the symmetry of the $I_{2D}$ peak. It is the symmetry of the 2D peak that distinguishes a turbostratic graphene layered material from an AB stacked graphene layered material, and is indicative of rotational stacking disorder versus a layered stacking order.

Carbon materials with high AB stacking order will still exhibit 2D peaks, however, these 2D peaks exhibit a doublet that breaks the symmetry of the peak. This break in symmetry is exhibited in both AB stacked graphene of a few layers or graphite of many layers. Thus, the 2D peak, which is a very strong indicator of the presence of stacking order regardless of the number of graphene layers present in the material, is of significance when selecting a graphene or graphene-based additive. It is the rotational disorder of the stacking in the low-defect turbostratic carbon of the present disclosure that distinguishes itself from all the other graphene or graphene-based additives used to date, as the rotational disorder of the low-defect turbostratic carbon stacking of the present application is what offers flexibility to the carbon-based particles of the present application, which therein enables the ability of these carbon-based particles to provide and preserve contact with the active primary particle of the composite particles comprising the electrode of the electrochemical cell. The result is an electrochemical cell having increased cycle life, better cycle life stability, enhanced energy density, and superior high rate performance.

Silicon and silicon alloys significantly increase cell capacity when incorporated within an electrode of an electrochemical cell. Silicon and silicon alloys are often incorporated within an electrode comprising graphite, graphene, or other carbon-based active materials. Examples of electrodes comprising carbon-based materials and silicon are provided in U.S. Pat. Nos. 8,551,650, 8,778,538, and 9,728,773 to Kung et al., and U.S. Pat. Nos. 10,135,059, and 10,135,063 to Huang et al., all the contents of which are fully incorporated herein by reference.

One embodiment of the present material comprises a composite particle. The composite particle may comprise at least one primary particle (i.e., active material particle), wherein the primary particle comprises a metalloid or a metal oxide material. The primary particle may be an anode active material particle. The primary particles may have an average particle size ranging from about 1 μm to about 15 μm. Alternately, the average primary particle size may be less than about 1 μm. The primary particle may have a surface area ranging from about 0.5 m$^2$/g to about 50 m$^2$/g. In an embodiment, the metal oxide of the primary particle comprises silicon oxide ($SiO_x$), wherein x ranges from about 0.1 to about 1.3. Some embodiments may comprise a low-defect turbostratic carbon at least partially covering the primary particle. The low-defect turbostratic carbon may be in the form of platelets comprising from one to about 10 layers of a graphene material, such as graphene, graphene oxide, or reduced graphene oxide. In some embodiments, the low-defect turbostratic carbon may comprise at least 90%, such as from about 90% to about 100% graphene.

In an embodiment, the composite particles may have an average particle size of ≤10 μm. In an embodiment, an average particle size may be about 1 μm or less. In an embodiment, an average size of the composite particles may range from about 0.5 μm to about 15 μm, from about 0.5 μm to about 5 μm, from about 0.5 μm to about 2 μm, or from about 0.5 μm to about 1.5 μm. The composite particles may be included in an active electrode material, such as an active anode electrode material.

The composite particles may be formed by combining the electrochemically active and the low-defect turbostratic carbon materials in a dry weight ratio between 7:3 and 99:1. For example, the active material and the carbon material may be combined to form a dry mixture that does not include a liquid solvent, or in a wet mixture that does include a liquid solvent. For example, in some embodiments, the raw active and carbon materials may be suspended in a polar liquid solvent such as water or ethanol by high shear mixing or ultrasonication. An important advantage of low-defect turbostratic carbon is that it can be suspended in a polar solvent at high solids loadings making it suitable for low cost wet chemistry processing. Graphene oxide is a possible option because of its various oxygen-containing functional groups. The oxygen-containing functional groups are attached to the carbon lattice and enable suspension of the graphene oxide in various polar solvents at a low solids loading. Other types of carbon additives often lack suspension capability and therefore must be dry processed or grown directly on the host material. A suspension of some materials may also be promoted through the use of a surfactant. Of significance is that the high conductivity enabled by the low-defect turbostratic structure allows lower ratios of the material (<90:10 and as low as 99:1) to be mixed with the electrochemically active material for comparable conductivity enhancements when compared to other carbon additives.

Once the raw material suspension is made, it is then aerosolized and dried in a vacuum heating chamber to force the suspended solids into intimate contact. Depending on the final powder particle requirements, process parameters may vary. For example, crumpled ball-like composite particles are formed by aerosolizing droplets and then rapidly drying them in the heating chamber. For example, an atomizer nebulizes the raw material suspension to form aerosol droplets. The nebulizing step requires sufficient spray parameters to allow the particles within the droplets to become ordered before aerosol evaporation initiates. For turbostratic carbon materials, the particles within the droplet migrate to the surface of the droplet to form a hollow envelope of sphere upon drying. If the droplet only contains turbostratic carbon, the envelopes may be used as a conductive additive to an electrode material. The envelopes minimize particle aggregation and agglomeration as this structure overcomes strong inter-particle van der Waals attraction forces that cause restacking of carbon material sheets which complicates solution processability and reduces particle accessible surface area. This structure is also stable against unfolding or collapsing.

If the droplet contains both a carbon-based material and an electrochemically active material, then the electrochemically active material may locate centrally in the droplet, while the carbon-based material may be localized at the surface of the droplet. The ordered aerosol droplets being flown through a preheated furnace allow the carbon-based material particles to localize, cluster and tile at the droplet surface which are then ready to encapsulate the electrochemically active material centrally located within the droplet. The clustering and tiling while encapsulating occurs as the droplet shrinks due to evaporation during drying. The turbostratic carbon is then concentrated fully surrounding the electrochemically active material internal cargo, forming an initial ball-like structure. As the droplet continues to shrink, curvature is introduced followed by pronounced wrinkles, bends and twisted edges. Eventually, the platelets/sheets isotropically compress through capillary forces that fully crumple, transforming into crumpled balls having a myriad of wrinkles, bends and twists that do not relax over time. This structural transformation of the carbon-based particles to form an envelope surrounding the core material is important to the integrity of the particle, as any relaxation of the turbostratic carbon envelope would re-introduce the internal particle cargo to electrolyte exposure and the effects of fracture and unstable SEI formation.

Preparation of the mixture to be aerosolized may also be important, as the intention is to create a heterogeneous droplet comprising solid particles suspended in the liquid forming the droplet. The liquid forming the droplets should be one that preserves the integrity of the particles within so that particles will isotropically compress and plastically deform to form a near-spherical particle just like a crumpled paper ball. Additionally, it is important for the droplets to be sustained in the furnace carrier gas for the duration (that is, until full evaporation is achieved) in order to complete the crumpled ball-like envelope and the encapsulation of the internal cargo. In this way, an aerosol assisted evaporation capillary compression process forms particles resembling hollow balls that resists aggregation, exhibits excellent processability, and can either be used as an electrically conductive additive or can alternately encapsulate an electrochemically active internal cargo for use in electrodes of electrochemical cells.

Once droplet evaporation is complete, the dry powder is collected. After collection, the dry powders may be heat treated in an inert atmosphere, such as argon gas, to carbonize any remaining surfactant or dispersant. The resulting dry powder can then be classified by sieving or filtration to achieve a desired particle size distribution for a given application.

One embodiment of the present material comprises an active electrode material, the active electrode material comprising a metalloid and/or metal oxide active material. The active material may comprise an active anode material. The active material may additionally comprise a carbon-based material additive. The carbon-based material additive may comprise a low-defect turbostratic carbon-based material. In some embodiments, the low-defect turbostratic carbon comprises graphene platelets that are part of a structure comprising a continuous network for a composite electrode material comprising: (a) a mechanical support for an active electrode material; and (b) an electrically conductive pathway for the active electrode material. The mechanical support assists the electrically conductive pathway by providing and preserving contact between the active electrode material and the carbon-based material additive during electrochemical cell cycling.

One embodiment of the present material comprises an electrode, the electrode comprising a metalloid or metal oxide active material. The electrode may alternately comprise a carbon-based material. The electrode may comprise both a metalloid or metal oxide material and a carbon-based material. The carbon-based material may include low-defect turbostratic carbon, which may be present at crumpled platelets comprising one or more sheets of graphene. The electrode may comprise: a composite particle; an electrochemically active particle; an electrically conductive particle; an electrically insulating particle; a chemically active particle; an intercalating/deintercalating particle; a carbon-based particle; a metalloid or metal oxide particle; an alloy particle; a crumpled particle; an agglomerated particle; a composite particle; and combinations thereof. In some embodiments, the composite particle diameter may be on average≤1 µm. In some embodiments, the composite particle diameter may range from about 1 µm to about 15 µm. The electrode may comprise turbostratic carbon sheets or platelets that partially overlap to simulate larger size single sheet structures. In some embodiments the platelets have more than one or more layers of a graphene-based material. In some embodiments, the platelets may have sheet size may be on average≤15 µm. In some embodiments, the platelets may have sheet size may be on average≤1 µm. In some embodiments, the turbostratic carbon-based material platelets may have low thickness. In some embodiments, a low thickness of the turbostratic carbon-based material platelets may be on average≤1 µm. In some embodiments, a low thickness of the turbostratic carbon-based material platelets may be on average≤100 nm. In some embodiments, the turbostratic carbon-based material platelets wrap around, weave/interweave through or are bonded to at least some of the particles of the electrode material in the electrode. The electrode may further comprise one of a binder or binders, a non-crosslinking polymer or polymers, a crosslinking polymer or polymers, and combinations thereof. The electrode may be one of an anode, a cathode, or both.

Low-defect turbostratic carbon materials are conducive for electrode slurry coating techniques. Electrodes may comprise a low-defect turbostratic carbon material and, optionally, a binder and an additional electrochemically active material. Electrodes may comprise one of the following: (1) a low-defect turbostratic carbon material or materials only; (2) a low-defect turbostratic carbon material or materials and other carbon-based material additives, such as carbon black, graphite, graphite oxide, graphene, exfoliated graphite or graphene, graphene oxide, rGO, partially reduced GO, carbon nanotubes (CNTs) such as single walled, double walled or multi-walled CNTs, graphene platelets, nanoplatelets or nanoparticles, nanoplatelets or nanoparticles comprising a graphene sheet or a few graphene sheets, and combinations thereof; (3) a low-defect turbostratic carbon material or materials and a cathode active material or materials, such as: a metal oxide, a lithiated metal oxide, a metal fluoride, a lithiated metal fluoride or combinations thereof; a sulfur, a lithium sulfide, a metal fluoride, a lithium metal fluoride, a lithium metal phosphate, and a lithium metal silicate where the metal may comprise a transition metal, such as iron, manganese, cobalt, nickel, copper, vanadium, chromium, and/or non-transition metals such as bismuth, and combinations thereof; lithium rich cathode active electrode materials which may include magnesium, strontium, barium, cadmium, zinc, aluminum, gallium, boron, zirconium, titanium, calcium, selenium, yttrium, niobium, chromium, iron, vanadium, lithium and combinations thereof; and (4) a low-defect carbon-based material or materials and an anode active material or materials comprising an anode active constituent, the anode constituent comprising a metalloid or metal oxide material.

The electrode may comprise a composite material mixture capable of providing 100% of the anode lithium capacity or may be mixed with other lithium active materials such as graphite, graphite oxide, graphene, graphene oxide, rGO, and partially reduced GO in a 0-100% mixture. If the electrode includes a binder to hold the electrode material together, the binder may comprise a polymeric material such as a polyvinylidene fluoride (PVDF), carboxy methyl cellulose (CMC), styrene butadiene rubber (SBR), CMC/SBR, polyacrylic acid (PAA), lithium polyacrylic acid (LiPAA), or combinations thereof. The electrode material components are then mixed into a polar solvent such as water or N-methyl-2-pyrrolidone (NMP) at a solids loading in the range of about 20 wt % to about 60 wt % to form an electrode slurry. Mixing is typically achieved with a planetary mixer and high shear dispersion blade. The electrode slurry is then coated onto a metal substrate, typically copper or aluminum, at an appropriate mass loading to balance the lithium capacity of the anode with that of the selected cathode. Coating can be conducted using a variety of apparatus such as doctor blades, comma coaters, gravure coaters, and slot die coaters. After coating the slurry is dried under forced air between room temperature and about 120° C. Prior to cell assembly, the final electrode processing steps include pressing the electrode to reduce internal porosity and slitting to an appropriate geometry. Typical anode pressed densities can range from about 1.0 g/cc to about 1.7 g/cc depending on the composition of the electrode and the target application. Cathode pressed densities may range from about 2.7 to about 4.7 g/cc.

One embodiment of the present material comprises an electrochemical cell, the electrochemical cell comprising an anode, a cathode and a non-aqueous electrolyte comprising a lithium salt. The anode comprises a metalloid or metal oxide material. The anode further comprises a low-defect turbostratic carbon material. The anode may comprise composite particles. The composite particles may further comprise a crumpled ball-like structure, wherein the crumpled structure comprises a low-defect turbostratic carbon material encapsulating a metalloid or metal oxide material in its core. The anode may alternately comprise an anode material mixture having particles comprising a metalloid or metal oxide material and particles comprising a turbostratic carbon material. The turbostratic carbon material may comprise low-defect turbostratic carbon sheets that wrap around and/or are bonded to at least some of the primary particles comprising the metalloid or metal oxide material. The cathode may comprise a carbon-based material. In addition to the traditional carbon-based materials used in electrochemical cell cathode electrodes, it is contemplated that the low-defect turbostratic carbon material of the present application may also be used as an additive to the cathode electrode of an electrochemical cell.

Construction of an electrochemical cell involves the pairing of a coated anode substrate and a coated cathode substrate that are electronically isolated from each other by a polymer and/or a ceramic electrically insulating separator. The electrode assembly is hermetically sealed in a housing, which may be of various structures, such as but not limited to a coin cell, a pouch cell, or a can cell, and contains a nonaqueous, ionically conductive electrolyte operatively associated with the anode and the cathode. The electrolyte is comprised of an inorganic salt dissolved in a nonaqueous solvent and more preferably an alkali metal salt dissolved in a mixture of low viscosity solvents including organic esters, ethers and dialkyl carbonates and high conductivity solvents including cyclic carbonates, cyclic esters and cyclic amides. A non-limiting example of an electrolyte may include a lithium hexafluorophosphate ($LiPF_6$) or lithium bis(fluorosulfonyl)imide (LiFSi) salt in an organic solvent comprising one of: ethylene carbonate (EC), diethyl carbonate (DEC), dimethyl carbonate (DMC), fluoroethylene carbonate (FEC) or combinations thereof. Additional solvents useful with the embodiment of the present invention include dialkyl carbonates such as tetrahydrofuran (THF), methyl acetate (MA), diglyme, triglyme, tetragylme, 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, dipropyl carbonate, and combinations thereof. High permittivity solvents that may also be useful include cyclic carbonates, cyclic esters and cyclic amides such as propylene carbonate (PC), butylene carbonate, acetonitrile, dimethyl sulfoxide, dimethyl formamide, dimethyl acetamide, gamma-valerolactone, gamma-butyrolactone (GBL), N-methyl-2-pyrrolidone (NMP), and combinations thereof. The electrolyte serves as a medium for migration of lithium ions between the anode and the cathode during electrochemical reactions of the cell, particularly during discharge and re-charge of the cell. The electrochemical cell may also have positive and negative terminal and/or contact structures.

In various embodiments described above, the metalloid or metal oxide material is selected from the group consisting of silicon (Si), germanium (Ge), tin (Sn), lead (Pb), antimony (Sb), bismuth (Bi), zinc (Zn), aluminum (Al), silver (Ag), gallium (Ga), magnesium (Mg), carbon (C), nickel (Ni), cobalt (Co), manganese (Mn), iron (Fe), sulfur(S), and cadmium (Cd); alloys thereof, intermetallic compounds thereof, oxides thereof, or any combination thereof.

Figure 3:
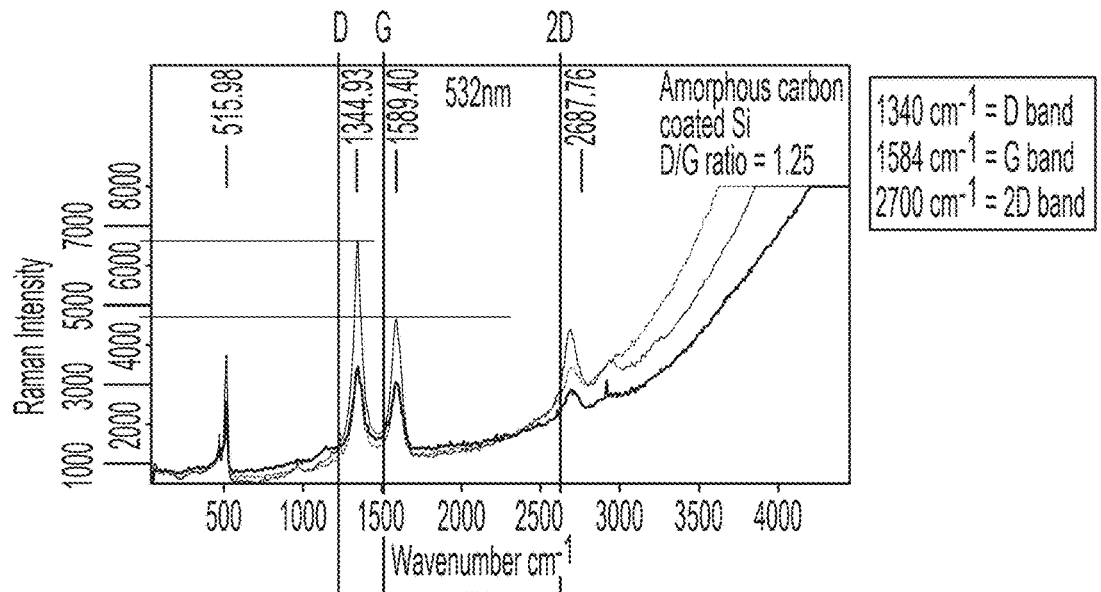
FIG. 3 illustrates the Raman spectrum of an electrode active material comprising SiO$_x$ primary particles encapsulated by a reduced graphene oxide (rGO).
Figure 4:
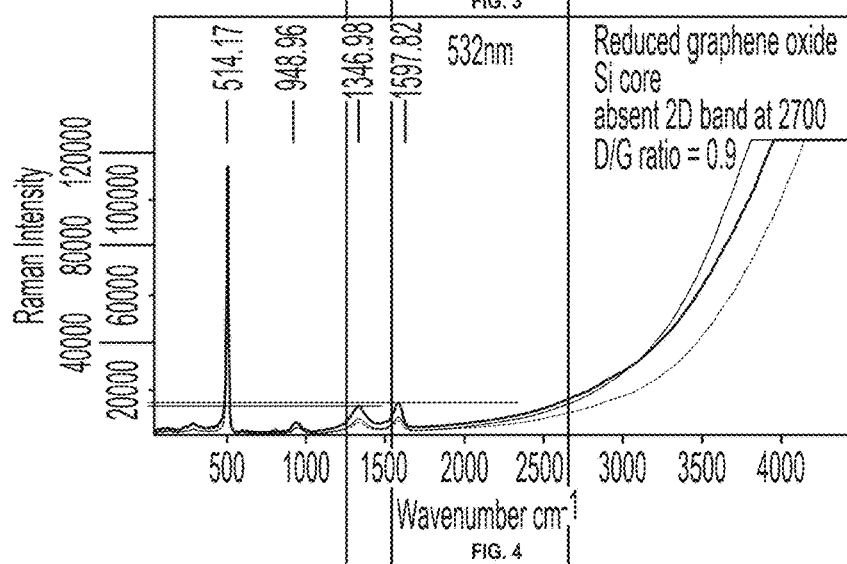
FIG. 4 illustrates the Raman spectrum of an electrode active material comprising SiO$_x$ primary particles coated with an amorphous carbon.
Figure 5:
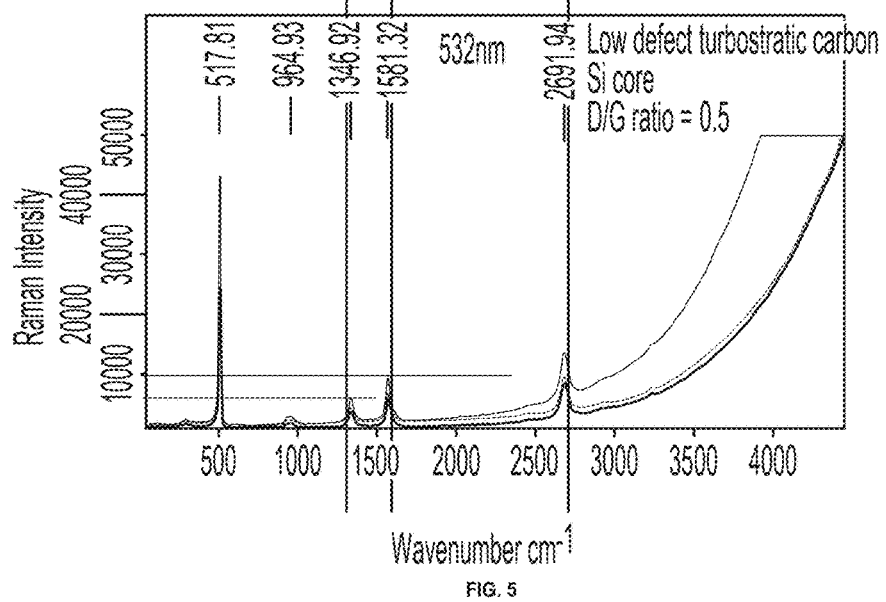
FIG. 5 illustrates the Raman spectrum of an electrode active material comprising SiO$_x$ primary particles encapsulated by a low-defect turbostratic carbon.

FIGS. 3-5 illustrate Raman spectra for active material mixtures comprising $SiO_x$ primary particles encapsulated by or coated with a carbon material. FIG. 3 is a graph of the Raman spectra for an active material mixture comprising $SiO_x$ primary particles coated with an amorphous carbon material. FIG. 4 is a graph of the Raman spectra for an active material mixture comprising $SiO_x$ primary particles encapsulated by rGO. FIG. 5 is a graph showing the Raman spectra for an active material mixture comprising $SiO_x$ primary particles encapsulated by a low-defect turbostratic carbon. Each spectra is different because of varying layer thickness (size, shape and position of 2D peak around wavelength 2700 $cm^{-1}$) and disorder (size of D peak around wavelength 1340 $cm^{-1}$).

Raman analysis sample preparation involved taking small aliquots of powders such as active material powders, composite material powders, carbon material powder, and placing these powders individually into a clean glass vial. The sample powder is rinsed with methanol. The powder/methanol solutions are then vortexed briefly and sonicated for approximately 10 minutes. The suspension is then transferred to a microscope slide with a micropipette. The slides are then allowed to air dry completely before conducting the analysis.

The Raman spectroscopy analysis of the present application is conducted using confocal Raman spectroscopy on a Bruker Senterra Raman System under the following test conditions: 532 nm laser, 0.02 mW, 50× objective lens, 90 second integration time, 3 co-additions (3 Raman spectroscopy sample runs) using a 50×1000 µm aperture and a 9-18 $cm^{-1}$ resolution. As a point of reference, the D band is not active in the Raman scattering of perfect crystals. The D band becomes Raman active in defective graphitic materials due to defect-induced double resonance Raman scattering processes involving the x-I electron transitions. The intensity of the D band relative to the G band increases with the amount of disorder. The intensity $I_D/I_G$ ratio can thereby be used to characterize a graphene material.

The D and G bands of the amorphous carbon shown in FIG. 3 are both of higher intensity than either the reduced graphene oxide (rGO) D and G bands of FIG. 4 or the turbostratic carbon D and G bands of FIG. 5. The amorphous carbon also exhibits a substantially higher $I_D/I_G$ ratio (1.25) than do rGO and turbostratic carbon. The suppressed intensity of the amorphous carbon G band compared to that of its D band reflects the lack of crystallinity (also known as its graphitic nature) within its carbon structure. The D peak intensity being higher than the G peak intensity is caused by the high amount of defects in the amorphous carbon network. Hence, the amorphous carbon spectra exhibits low crystallinity and a much higher degree of disorder in its graphitic network compared with more crystalline carbons, such as graphene, graphene oxide, and rGO. Moreover, the higher intensity of the rGO D peak compared with its G peak, and its higher $I_D/I_G$ ratio (almost 2×) compared to the turbostratic carbon D and G peak intensities and $I_D/I_G$ ratio indicates the rGO to have more defects than the turbostratic carbon of the present application.

Table 1 below provides the detail for the Raman spectra of FIGS. 3 through 5.

TABLE 1

| | D | G | 2D | $I_d/I_g$ | $I_{2D}/I_g$ |
|---|---|---|---|---|---|
| rGO | | | | | |
| Cm⁻¹ | 1346.98 | 1597.82 | — | | |
| Intensity | 9115.5 | 10033.3 | — | .91 | — |
| Low Defect Turbostratic Carbon | | | | | |
| Cm⁻¹ | 1346.92 | 1581.32 | 2691.9 | | |
| Intensity | 2915.3 | 5849.98 | 6009.4 | 0.5 | 1.03 |
| Amorphous Carbon | | | | | |
| Cm⁻¹ | 1344.93 | 1589.40 | 2695.4 | | |
| Intensity | 6194.8 | 4908.2 | 5238.5 | 1.25 | 1.07 |

Careful inspection of these spectra show that when disorder increases, the D band broadens and the relative intensity of the band changes. For the amorphous carbon coated sample, the high intensity (6194.8) and broad D peak indicates a high amount of defects. The G peak being lower in intensity (4908.2) then the D peak (6194.8) indicates a lack of crystallinity. The D peak intensity (9115.5) and G peak intensity (10033.3) of the rGO encapsulated sample are fairly alike. Noticeable, however, is that the D peak intensity (9115.5) of the rGO sample is substantially higher than the D peak intensity (2915.3) of the turbostratic carbon sample indicating that the rGO sample has substantially higher defect density than does the turbostratic carbon sample. Also noticeable is that the G band for the amorphous carbon and the rGO samples are shifted to the right of wavelength 1584 cm⁻¹ to wavelength 1589.4 cm⁻¹ and 1597.82 cm⁻¹ respectively, whereas the G band for the turbostratic carbon sample lies slightly to the left of wavelength of 1584 cm⁻¹ at 1581.32 cm⁻¹. Of significance is that, unlike the amorphous carbon and the rGO samples, the turbostratic carbon (in this case, graphene sample) does not display much, if any, shift in position, reflecting low-defects therein, thus, the turbostratic carbon sample most nearly resembles an almost 'perfect' turbostratic carbon material. In some embodiments, the turbostratic carbon may have a Raman spectrum having a G band having a peak intensity ($I_G$) at wave number ranging from about 1530 cm⁻¹ to about 1600 cm⁻¹, such as from about 1530 cm⁻¹ to about 1584 cm⁻¹, or from about 1580 cm⁻¹ to about 1600 cm⁻¹.

Figures 6A, 6B:
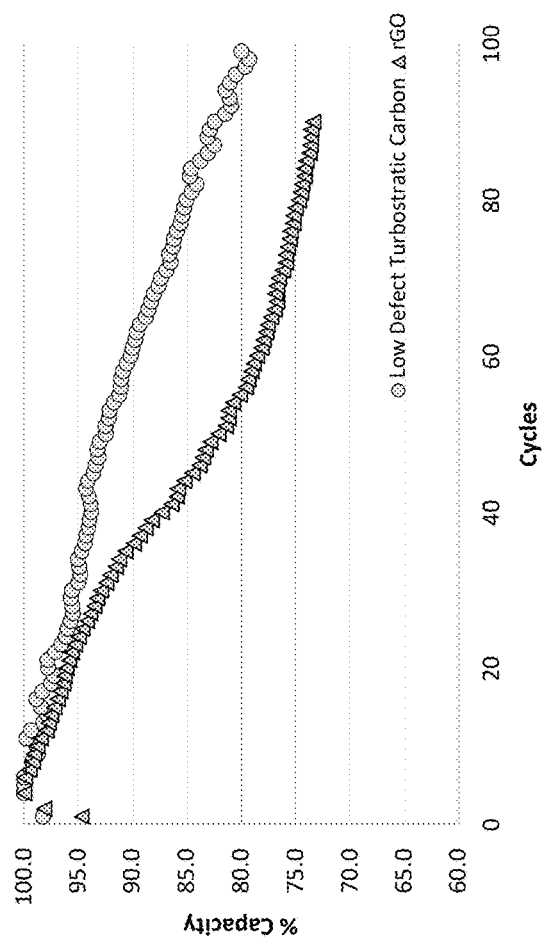
FIG. 6A is a graph showing the cycle life for exemplary and comparative half-cells.
FIG. 6B is a table comparing specific capacity, first coulombic efficiency (CE), and number of cycles to 80% capacity of the exemplary and comparative half-cells of FIG. 6A, according to various embodiments of the present disclosure.

FIG. 6A is a graph comparing cycle life for exemplary half-cells including anodes including the exemplary composite particles comprising $SiO_x$ primary particles, wherein x is about 0.6, encapsulated by low-defect turbostratic carbon, and comparative half-cells including anodes including anodes comprising comparative composite particles comprising $SiO_x$ primary particles encapsulated by rGO. FIG. 6B is a chart comparing the specific capacity, first coulombic efficiency (CE), and percent capacity retained to 80% capacity for the exemplary and comparative half-cells.

Referring to FIGS. 6A and 6B, the exemplary and comparative composite particles had a $SiO_x$:carbon ratio of about 80:20. The anodes were formed by coating the respective anode material suspensions onto substrates. The respective electrode compositions included an active material:conductive additive:LiPAA binder ratio of 75:5:20. Electrodes were punched and calendered to 1.1 g/cc pressed density and built into the electrochemical test cells using either a lithium or NMC 523 counter electrode, a polypropylene separator, and a 1.0M LiPF6 EC:DEC (3:7) electrolyte with 20% FEC additive. The table of FIG. 6B shows that the exemplary half-cell including the low-defect turbostratic carbon anode material had a first coulombic efficiency 3% higher than the comparative half-cell including the comparative anode material including rGO, demonstrating less irreversible loss of lithium upon formation. Moreover, exemplary half-cell retained 98% of its capacity when cycled to 80% of its designed capacity, whereas the comparative half-cell retained only 57% of its capacity when cycled to 80% of its designed capacity. The exemplary half-cell thereby exhibited about 42% more capacity retention as compared to the comparative half-cell, demonstrating the positive impact that the low-defect turbostratic carbon material has on cycling stability.

Figure 7:
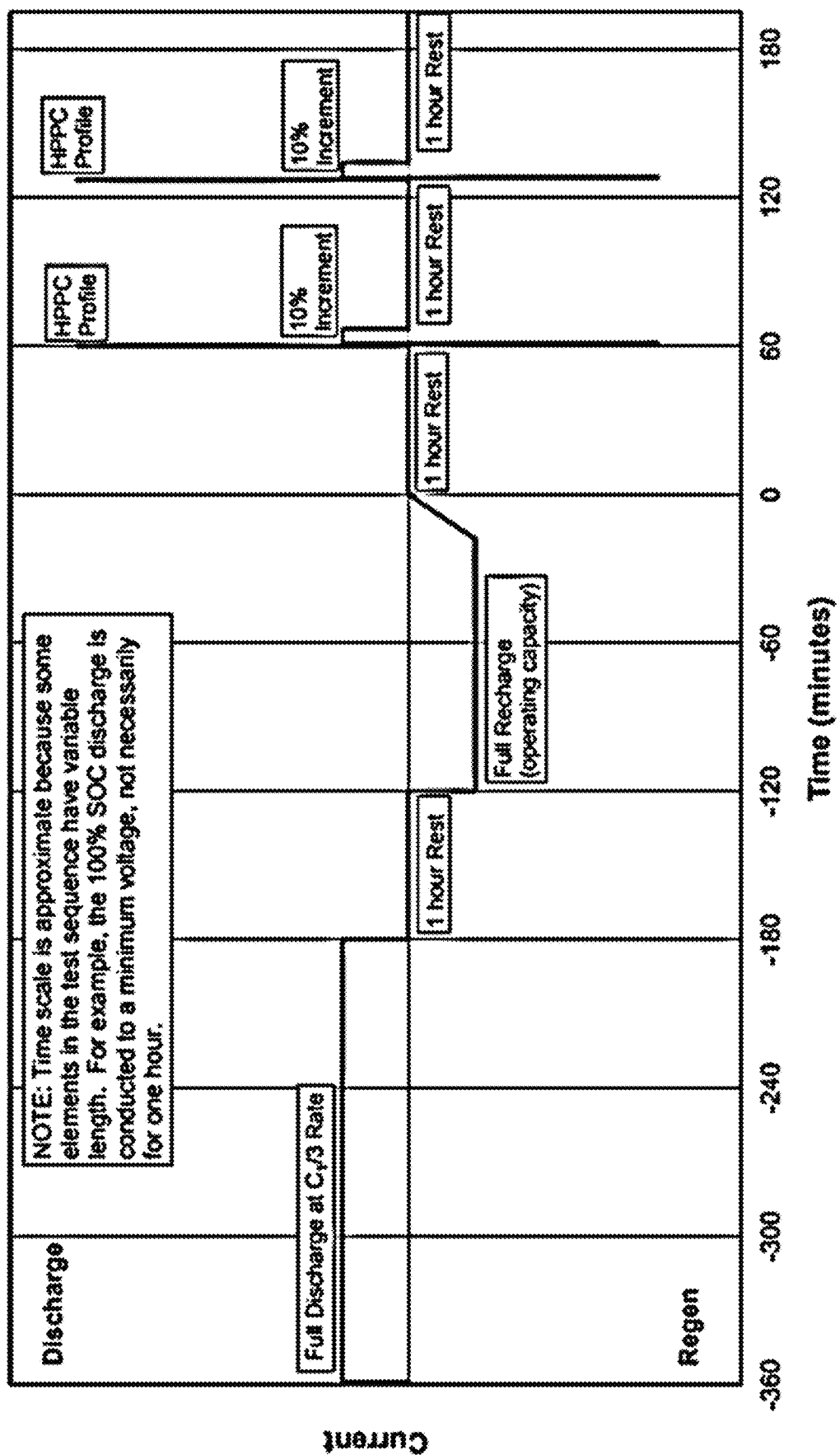
FIG. 7 is a graph showing an exemplary hybrid pulse power characterization test regimen.

FIG. 7 is chart showing the sequence of rest periods, pulse profiles, and discharge segments for current application during the standardized hybrid pulse power characterization (HPPC) technique developed by the U.S. Council of Automotive Research for the development of battery technologies for electric vehicles. The objective of this test is to determine the discharge-pulse (5C rate) and the charge-pulse (3.75C) power capabilities at each 10% capacity increment relative to the maximum operating capacity for a given cell. Between each pair of discharge and regeneration (charge) pulses, the device is discharged to the next 10% increment based on operating capacity using the C/3 rate. The HPPC test begins with a charged device up to Vmax using the manufacturer recommended procedure followed by a default rest period (often 1 hour). The test is generally programmed so that 10% of the operating capacity is removed in each test segment, including that removed by the pulse profile itself. An HPPC profile is performed immediately followed by a discharge to the next 10% increment of the rated capacity at the C/3 and a default rest. This sequence is repeated until the final profile at or near 90% of the operating capacity is removed. The test terminates with a discharge of the device at the C/3 rate to Vmin0 and a final default rest.

Figure 8:
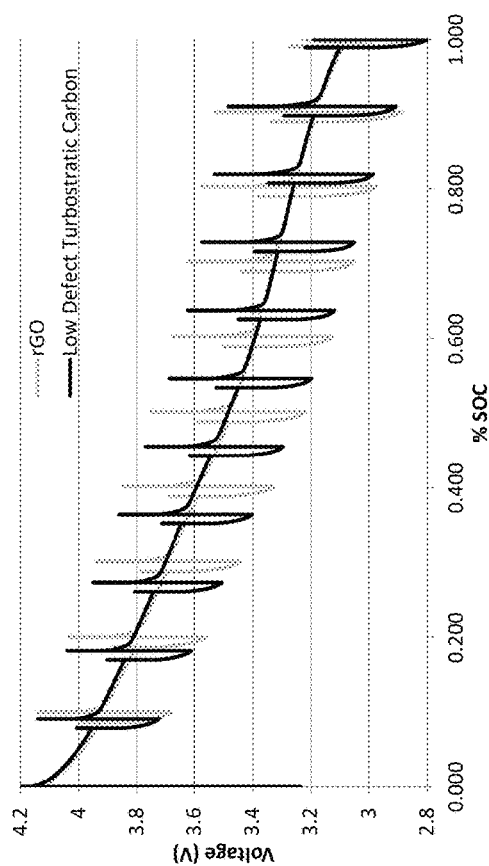
FIG. 8 is a graph showing a voltage polarization comparison of exemplary and comparative full cells, according to various embodiments of the present disclosure.
Figure 9:
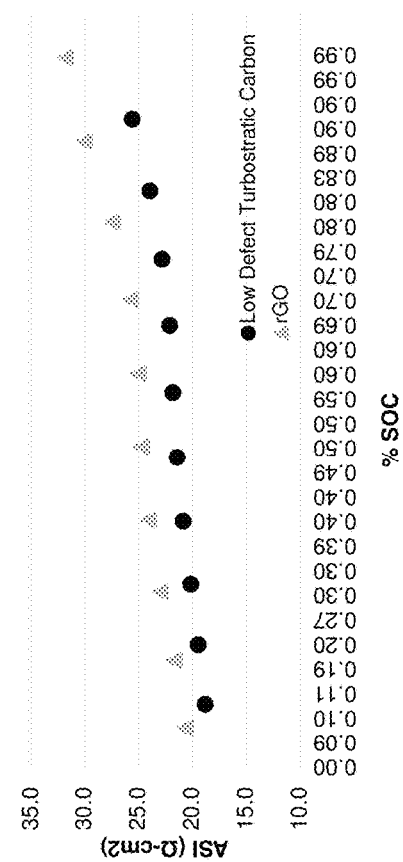
FIG. 9 is a graph showing area specific impedance (ASI) plots calculated using voltage response curves from FIG. 8 at various states of charge (SOC) of exemplary and comparative full cells.
Figure 10:
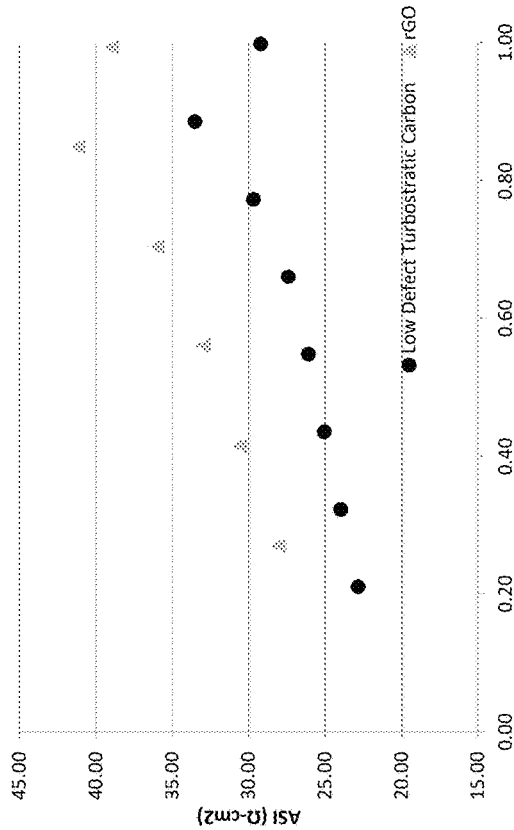
FIG. 10 is a graph showing ASI data calculated using voltage response curves FIG. 9 after 30 cycles of electrochemical testing of exemplary and comparative full cells.

FIGS. 8-10 are graphs respectively showing a high-rate capability comparison of the voltage polarization, area specific impedance (ASI) plots, and data, of exemplary and comparative full cells. The ASI in FIGS. 9 and 10 was measured based on the HPPC technique of FIG. 7. The measured value of ASI is a complex combination of resistances within a battery resulting from the physical processes occurring at different length and time scales. A measured value ASI, therefore, is a function of several factors, including: state of charge (SOC), pulse length, current density, C-rate, particle size, lithium diffusion length and specific medium. The combination of these factors is measured through a voltage response (polarization) to a charge or discharge current pulse as defined by the equation below:

$$\frac{V_{t0} - V_{t1}}{I_{t1} - I_{t0}} = ASI$$

where V=measured voltage of the cell
I=applied current
t0=time immediately prior to application of pulse current, and
t1=time immediately prior to termination of applied pulse current.

The exemplary and comparative electrochemical full cells were constructed keeping all components and raw materials constant except for the comparative cells including the exemplary anode material including turbostratic carbon and the comparative cells including the comparative anode material including rGO. FIG. 9 is a graph showing that the results of the HPPC testing conducted for FIG. 8, which indicate that the ASI of the exemplary cell was lower at all SOC than the ASI of the comparative cell, at the same SOC. For FIG. 9, ASI is calculated using voltage response curves from FIG. 8 at various SOC. This effect is attributed to a reduced resistance contribution of the turbostratic carbon additive to the overall cell polarization, due to its lower defect ratio within the turbostratic carbon lattice. This trend also continues as the test cells were cycled to 100% of discharge.

FIG. 10 shows that after 30 cycles of full cell cycling between 4.2 V-2.8 V, using a 0.5 C constant current constant voltage (CCCV) charge protocol and a 2C discharge protocol, the ASI of the comparative cell increased by a greater amount than the ASI of the exemplary cell. For FIG. 9, ASI is calculated using voltage response curves from FIG. 8, after 30 cycles of electrochemical testing. This increase in ASI indicates that the comparative cell had lower cycling stability and greater resistance buildup upon repeated cycling, as compared to the exemplary cell. Moreover, the cycling stability of the comparative cell decreases and the resistance buildup thereof increased, as the number of cycles increased.

Figure 11:
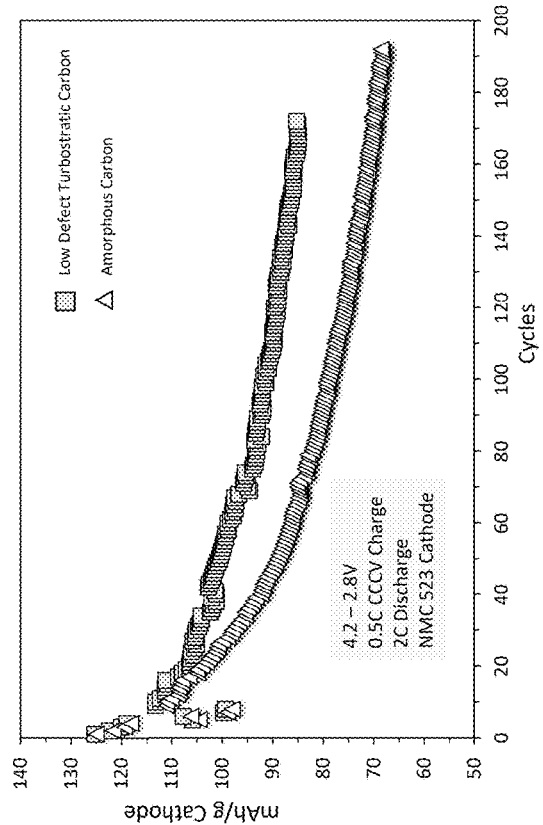
FIG. 11 is a graph showing the cycle life for exemplary and comparative full-cells.

FIG. 11 is a graph showing the cycle life for exemplary and comparative full cells, according to various embodiments of the present disclosure. Referring to FIG. 11, the exemplary and comparative full cells were 2032 coin-type cells that each included: an NMC cathode; a polypropylene separator; an electrolyte including 1.0M $LiPF_6$, in EC:DEC:DMC (1:1:1) and 20% FEC; and an anode comprising 60% $SiO_x$, 20% graphite, 5% conductive additive, and 15% PAA binder. The SiO of the exemplary anode was wrapped in turbostratic carbon, and the anode of the comparative cell was coated with amorphous carbon deposited by CVD.

As shown in FIG. 11, the exemplary cell showed better initial capacity at a 2C discharge rate than the comparative cell. The exemplary cell also showed improved cycling stability, as compared to the comparative cell.

FIG. 12A is a scanning electron microscope (SEM) image of a comparative composite particle comprising $SiO_x$ primary particles and aggregates of wrinkled rGO sheets at an 80:20 $SiO_x$:rGO wt % ratio. Visible are small grape-like clusters of $SiO_x$ particles (area 1) randomly distributed about the wrinkled rGO sheets (area 2). The composite particle shown is larger than 5 μm as derived from the image micron marker and exhibits morphological variations that can, additionally, unfavorably affect electrochemical properties of the powder comprising these particles. Various $SiO_x$ clusters encapsulated by the wrinkles of the rGO sheets are shown in the SEM image. Also shown, and of particular significance to the resultant electrochemical properties of the powder, is a particle morphology that exhibits numerous void spaces (area 3 is an example) having poor contact (i.e., lacks intimate contact) between the wrinkled rGO sheets and the $SiO_x$ primary particles. Additionally, the SEM image shows that the composite particle also exhibits an excessive amount of wrinkled rGO sheets absent $SiO_x$ clusters (area 4 is an example). This variation in the composite particle morphology is a result of choosing a large lateral rGO sheet size respective to the average $SiO_x$ primary particle used, thereby allowing excess rGO to fold upon itself, resulting in a composite particle with either excess or deficient rGO coverage of the $SiO_x$ primary particles. As previously disclosed, the $SiO_x$ primary particles may be submicron (less than 1 μm) or may have an average particle size ranging from about 1 μm to about 15 μm. Thus, these morphological variations that cause a lack of intimate and distributed contact with the $SiO_x$ particles, in addition to the higher defect density of said rGO (i.e., an $I_D/I_G$ ratio >0.8 as derived by Raman spectroscopy), further contribute to the reduced effectiveness of the rGO in providing conductivity to the $SiO_x$ primary particles, when compared to primary particles encapsulated with the low-defect turbostratic carbon of the present application.

FIG. 12B is an SEM image of exemplary composite particles comprising $SiO_x$ primary particles encapsulated by low-defect turbostratic carbon sheets at an 80:20 $SiO_x$:carbon wt % ratio. Visible are clustered Si alloy primary particles encapsulated by and in intimate contact with the low-defect carbo sheets that form discrete nearly spherical composite particles (area 1 is an example of one of these particles). The composite particles shown have a particle size of less than 5 μm as derived from the image micron marker. These composite particles have a defined structural fingerprint, displaying an $I_D/I_G$ ratio of greater than zero and less than or equal to about 0.8 and an $I_{2D}/I_G$ ratio of from about 0.5 to about 2.0 as determined by Raman spectroscopy conducted at 532 nm laser excitation wavelength, wherein an $I_D/I_G$ ratio≤0.8 indicates low-defect and an $I_{2D}/I_G$ ratio of about 0.5 or more indicates low sheet count of about 10 sheets or less. Additionally, a 2D band exhibiting a single peak profile that is symmetric about its peak and an intensity that is higher than that of its G band indicates turbostraticity and lack of AB stacking between the sheets. The low sheet count and the lack of AB stacking between the sheets of the low-defect turbostratic carbon material create a mossy mosaic-like structure on the surface of these composite particles (area 2 is an example). It is the low sheet count and lack of AB stacking order that permits flexibility of the composite particles such that create and sustain intimate contact between the $SiO_x$ primary particles and the encapsulating low-defect turbostratic carbon material. The intimate contact between the primary particles and the carbon is observable in the SEM image. Noticeable is that the low-defect turbostratic carbon material is distinctive in that it lacks the excess folding or wrinkling present in the rGO particle.

Various electrochemical tests were performed showing that the low-defect turbostratic carbon exhibited better performance than the reduced graphene oxide. The wrapping, mixing, coating, or encapsulating of silicon alloy actives materials with low-defect turbostratic carbon additives provides a flexible and conductive matrix to ensure individual particles remain in electrical contact after significant volume changes associated with lithiation/delithiation of the active material. Electrochemical performance of the silicon alloy anode material with respect to cycling stability and high rate discharge can be maximized by optimizing the defect characteristics of the carbon additive and properly incorporating it onto the surface of the silicon alloy active particle. Specifically, low-defect density is necessary for enhancing the inherent conductivity of the carbon material and intimate, even contact with the $SiO_x$ active material ensures that this enhanced conductivity participates in the charge transfer process upon lithium insertion and extraction.

Thermally Disproportionated Composite Particles

Silicon is a promising and attractive electrode material for use in high capacity lithium ion cells due to its favorable theoretical capacity and its availability. However, integration of silicon electrode materials into efficient and high performance battery electrodes has proven challenging due to the significant first cycle irreversible capacity loss and subsequent rapid capacity fade during cycling of electrochemical cells when battery electrodes made with these silicon electrode materials are used. In fact, studies have shown that: 1) it is difficult to form the (solid electrolyte interphase) SEI film on the surface of a Si electrode during the first cycle; 2) lithium ion (Li$^+$) insertion and de-insertion induces large volume expansion that can comprise electrode conductivity, with intercalation and deintercalation kinetics for Si becoming sluggish; and 3) electrochemical cell internal resistance changes with the state of lithiation after cycling. The novel particle structure of the present application and the method for making same address these issues by providing a particle structure and an electrode powder material that decrease and/or limit irreversible Li$^+$ reactions, decrease battery electrode resistance, and increase electrochemical cell 1$^{st}$ cycle lithiation/delithiation efficiency.

Currently, much research regarding silicon-based composite materials is actively being conducted. For example, researchers are investigating the use of a silicon-based material in combination with various other materials. Some studies focus on electrically conductive additives to silicon-based electrode powder materials. Some studies investigate coating silicon-based particles. Other studies involve electrode additive materials. Still other studies direct effort to electrolyte additives. Many of these studies actually identify solutions that do achieve levels of increased capacity, generally improve charge/discharge cycling behavior, or increase battery life. What is still an issue for silicon-based materials, however, is a low 1$^{st}$ cycle charge/discharge efficiency due to an irreversible formation of an electrochemically-inactive amorphous lithiated silicon oxide (Li$_x$-SiO$_y$) during initial charge/discharge cycling. The inventors of the present application have discovered that, by altering the starting SiO material through a thermal disproportionation reaction, and then using this altered SiO to form particles comprising the altered SiO and graphene for use in battery electrodes, the irreversible Li$^+$ reaction during initial electrochemical cell charge/discharge cycling substantially decreases. This decrease in the irreversible Li$^+$ reaction results in substantially higher electrochemical cell 1$^{st}$ cycle charge/discharge efficiency.

Silicon monoxide (SiO) powders are commercially available for a variety of applications, including powders for battery electrodes. SiO, an amorphous material comprising an oxidation state of +2, is known by way of experiments and theoretical calculations to be inherently unstable, and easily undergoes disproportionation, irreversibly forming silicon dioxide (SiO$_2$) and silicon (Si). The SiO disproportionation reaction has been studied for decades, and both chemical and thermal methods have been evaluated for specifically inducing disproportionation of SiO. Disproportionated SiO, however, has yet to be commercialized for any application, and its use in electrode materials for battery applications is virtually non-existent.

The objective of SiO thermal disproportionation is twofold: (1) to provide electrochemically-inactive amorphous SiO$_2$ domains to partially isolate oxygen atoms from the SiO matrix in order to mitigate undesirable irreversible reactions with lithium ions during initial battery charge (lithiation) and discharge (delithiation); and 2) to provide size controlled electrochemically-active crystalline Si-domains in order to provide increased battery capacity and/or battery energy density.

Li-ion batteries that include SiO as an anode active material may suffer from low first cycle coulombic efficiency and high irreversibility, due to the irreversible consumption of Li ions during initial charging. In particular, it is believed that, during initial charging, Li$^+$ ions may irreversibly react with SiO to form electrochemically inactive Li-silicates (e.g., Li$_2$Si$_2$O$_5$, Li$_6$Si$_2$O$_7$, and Li$_4$SiO$_4$) and Li$_2$O.

According to various embodiments of the present disclosure, first cycle coulombic efficiency may be improved by utilizing thermally disproportionated SiO$_x$ as an anode active material. In particular, the thermal disproportionation (or dismutation) reaction of SiO may be exemplified by the following Formula 1:

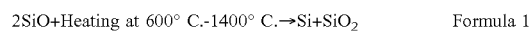

2SiO+Heating at 600° C.-1400° C.→Si+SiO$_2$         Formula 1

According to various embodiments of the present disclosure, composite particles of an electrode material may each include a primary particle comprising a conductive silicon composite coated with low-defect turbostratic carbon. As discussed in detail below, the composite particles may be formed by heat-treating primary particles comprising SiO$_x$, wherein x ranges from about 0.7 to about 1.2, such as from about 0.9 to about 1.1, to disproportionate the SiO$_x$ and form the conductive silicon composite. The turbostratic carbon coating may be applied before or after the heat treatment.

Figure 13A:
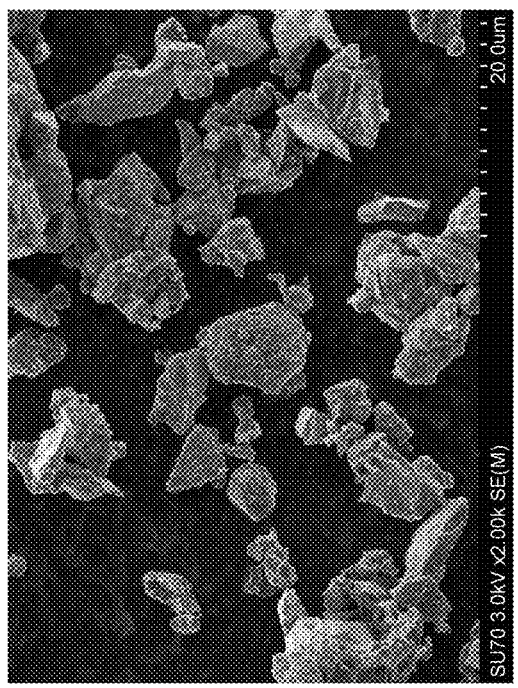
Figure 13B:
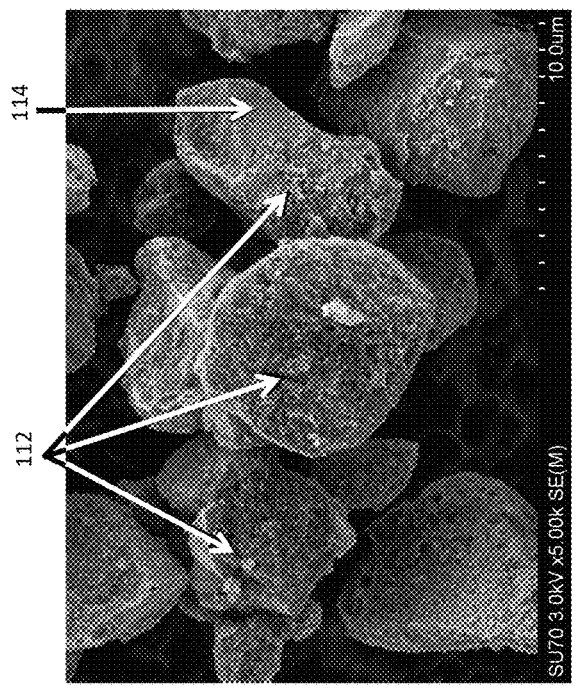

FIGS. 13A and 13B are scanning electron microscope (SEM) images of a plurality of composite particles 100 of the present application. The composite particles 100 shown to at least partially comprise a heterogeneous composite particle structure, the heterogeneous composite particle structure comprising an electrochemically-active component, an electrochemically-inactive component, and an electrically conductive component. The electrochemically-active component further comprises one of amorphous SiO, Si nano-crystals, or both. The electrochemically-inactive component comprises amorphous SiO$_2$. The electrically conductive component comprises graphene.

The composite particles 100 of FIG. 13B shows the composite particles 100 at a higher magnification than in FIG. 13A. Noticeable is that the particle morphology comprises a mixed surface texture comprising both mottled and smooth areas. The mottled areas comprise porous graphene 112 and the smooth areas comprise an amorphous material 114, the amorphous material comprising amorphous SiO, amorphous carbon, or both. The term "morphology" as used herein is defined as a structure and a feature or features of a surface. Specifically, "morphology" is the structure and features of the exterior surface of a particle, a nanoparticle or a macroparticle of an electrode material. FIG. 13B shows the porous graphene 112 partially enmeshing the dpp-SiO, with the amorphous material 114 partially being visible. It is understood that the porous graphene 112 may completely enmesh the amorphous material 114. Both types of heterogeneous composite particles may be used to make battery electrodes either alone or in combination with each other.

FIGS. 13C and 13D are enlarged images of two composite particles extracted from the SEM image depicted in FIG. 13B. The spaces, holes and irregularities of the porous graphene 12 are more visible in these enlarged images. The spaces, holes and irregularities shown facilitate particle-to-particle intermingling and electrical interconnection, and also impart microporosity to the surface of the composite particles 100. The microporosity provided to the particle surface is in addition to the mesoporosity of any agglomerated particles in the electrode material powder, and the macroporosity of the electrode itself when made using such particles. Further, in addition to the particle surface microporosity, there is also a microporosity contribution from the disproportionated SiO as well. The disproportionation reaction induced in the SiO during heat treatment causes unsaturated bonds within the silicon oxide to locally develop. The unsaturated bonds emerge when the structural transition from SiO to Si and SiO$_2$ occurs, introducing disorder and defects that initiate pore development in the dpp-SiO. The combination of the microporosity on the surface of the heterogeneous composite particle and within the disproportionated SiO, the mesoporosity of agglomerated particles and the macroporosity of the electrode itself provides the following electrode performance benefits: i) enhances the electrolyte absorption capability of the electrode; ii) augments wetting of the electrolyte at the electrode-electrolyte interface; iii) improves ionic diffusion to the particle surface; and iv) promotes interfacial charge transfer. The end result is a decrease in electrode charge transfer resistance.

Further regarding graphene, besides providing microporosity to the heterogeneous composite particles, graphene, having superior electrical conductivity, imparts superior electrical conductivity to such particles, thereby substantially reducing the internal resistance of a battery electrode. The resistance of a battery electrode consists of essentially three elements: 1) an internal electrode resistance, 2) a solid electrolyte interphase (SEI) resistance, and 3) a charge transfer resistance. The impact of the heterogeneous particle structure on charge transfer resistance is disclosed above. SEI resistance is due to a passivating film that is formed on an electrode surface by electrolyte decomposition. Once formed, the SEI film should protect the electrolyte solution within an electrochemical cell from further decomposition and should also favorably affect the safety, power capacity, shelf life, cycle life and performance of said electrochemical cells. While SEI films can undesirably limit the capacity and dynamic response of electrochemical cells by limiting ion transport, and while the resistance across the SEI film can also restrict current flow of an electrode, the SEI resistance is not the subject of the present application. Nonetheless, it is important to note that for optimal electrochemical cell performance, the SEI film should be highly permeable to lithium ions so that electrode concentration polarization is minimized while also serving as an electronic resistor to prevent said SEI film from further thickening, as electrode concentration polarization and SEI film thickening are associated with electrochemical cell internal resistance, self-discharge and low faradaic efficiency. High performance electrochemical cells, in addition to comprising SEI films that exhibit high ion-conductivity to reduce overvoltage, should also comprise uniform chemical composition and morphology to ensure homogeneous current distribution.

Referring once again to graphene and internal electrode resistance, specifically, the use of graphene as a component of the particle structure instead of as a conductive additive to an electrode material or to an electrode is important. It is known that silicon-based materials suffer from low intrinsic electrical conductivity ($10^{-5}$-$10^{-3}$ S/m), which can unfavorably impact internal electrode resistance. Carbon-based materials generally have electrical conductivities greater than $10^3$ S/m, so incorporating carbon-based materials into silicon battery electrode materials can favorably impact internal electrode resistance. However, since the electrical conductivity of graphene is superior to carbon-based materials, the effect on internal electrode resistance is even greater. The superior electrical conductivity of graphene compared with carbon-based materials is attributed to graphene being a zero-overlap semimetal. Graphene comprising both holes and electrons as charge carriers, so its electrical conductivity capability surpasses all other conductive materials, even other carbon materials. This is because, in graphene, each atom is connected to 3 other carbon atoms on its two dimensional plane, leaving 1 electron freely available in the third dimension for electronic conduction. These highly-mobile electrons, that is, the pi ($\pi$) electrons, are located above and below a graphene sheet. These pi orbitals overlap and help to enhance the carbon-to-carbon bonds in graphene. Fundamentally, the electronic properties of graphene are dictated by the bonding and anti-bonding, that is, the valance and conduction bands, of these pi orbitals. Hence, graphene as part of the particle structure, contributes not only to the electrical conductivity of individual particles, but also the overall conductivity of the battery electrode. Thus, the microporosity provided by graphene and dpp-SiO to the heterogeneous composite particle, thereby decreasing electrode charge transfer resistance, and the superior conductivity provided by specifically incorporating the graphene directly into the structure of the heterogeneous composite particle, leading to increased particle conductivity while decreasing internal electrode resistance.

FIGS. 14A and 14B are sectional, schematic views respectively illustrating thermally disproportionated composite electrode material particles 100, according to various embodiments of the present disclosure. Referring to FIGS. 14A and 14B, the composite particles 100 may include primary particle 102 respectively coated with an envelope 110. The envelope 110 may completely encapsulate the primary particle 102, as shown in FIG. 14A, or may partially encapsulate the primary particle 102, as shown in FIG. 14B.

The envelopes 110 may include a graphene-based material, such as low-defect turbostratic carbon. In some embodiments, the graphene-based material may include graphene, graphene oxide, partially reduced graphene oxide, or combinations thereof. The graphene-based material may further comprise a powder, particles, mono-layer sheets, multi-layer sheets, flakes, platelets, ribbons, quantum dots, tubes, fullerenes (hollow graphenic spheres) or combinations thereof. The envelopes 110 may also comprise other materials, such as lithium-containing species (e.g., LiF or the like), alkali metal species, polymeric coating species, amorphous carbon, and/or other conductive additives or agents.

For example, conductive additives or agents may comprise carbon black, KETJENBLACK, Super-P carbon black, low defect turbostratic carbon, acetylene black, channel black, furnace black, lamp black, thermal black, graphite, natural graphite, synthetic graphite, graphite oxide, partially reduced graphite, flake graphite, exfoliated graphite, platelet graphite or combinations thereof. The conductive agent may also comprise one of conductive fibers, carbon fibers, metal fibers, carbon nanotubes (CNTs), single walled CNTs, double walled CNTs, multi-walled CNTs, metal powder, fluorocarbon powder, aluminum powder, nickel powder; nickel flakes, conductive whiskers, zinc oxide whiskers, potassium titanate whiskers, conductive metal oxides, titanium oxide, conductive organic compounds, conductive polyphenylene derivatives, or combinations thereof. The binder may comprise sodium carboxymethyl cellulose (CMC), poly(vinyl alcohol) (PVA), lithium polyacrylate (Li-PAA), polyacrylonitrile (PAN), polyimide (PI), sodium alginate (SA), polymerized β-cyclodextrin (β-CDp), or combinations thereof.

In various embodiments, the primary particle 102 may represent from about 70 wt % to about 98 wt %, such as from about 80 wt % to about 97 wt %, of the total weight of the composite particle 100. The envelope 110 may represent from about 2 wt % to about 30 wt %, such as from about 3 wt % to about 20 wt %, of the total weight of the composite particle 100.

The primary particle 102 may comprise a silicon composite comprising active regions 104 and inactive regions 108, disposed in an amorphous matrix 106. Prior to a first charging reaction (e.g., prior to any Li-ion insertion in an electrochemical cell), the active regions 104 may include crystalline Si domains (zero valent Si). The inactive regions 108 may comprise materials that do not interact with Li$^+$ ions such as $SiO_2$. The matrix 106 may include amorphous SiO.

The oxygen atoms released by the formation of the crystalline Si of the active regions 104 may be sequestered in the inactive regions 108. As a result, the amount of oxygen available to irreversibly react with Li ions during an initial charging reaction (e.g., lithiation) may be reduced. Accordingly, the primary particles 102 may provide a higher first cycle Coulombic efficiency than primary particles comprising non-disproportionated $SiO_x$, which may also lead to a higher cell-level energy density.

During an initial charging reaction and/or subsequent charging reactions, the composition of the primary particle 102 may change due to lithiation and/or other reactions. For example, Si and SiO may be lithiated to form $Li_xSi$ active species. In addition, some SiO may form inactive species, such as lithium silicates and $Li_2O$.

During discharging, the $Li_xSi$ species may be de-lithiated to form crystalline or amorphous Si. The $Li_xSi$ species may also contain amorphous Si particles generated during an electrochemical delithiation process. However, the $SiO_2$, lithium silicates, and/or $Li_2O$ inactive species may remain in in the primary particle 102 without reacting.

Conventional thermally disproportionated $SiO_x$ materials may exhibit higher electrical resistivity due to the accumulation of $SiO_2$ on the surface of disproportionated Si material particles. In addition, lithium dendrites may also be formed on such particles, which may also degrade electrochemical performance. For example, the electrically-insulating $SiO_2$ may increase electrical resistivity. In addition, particle expansion and contraction during Li ion insertion and extraction may result in particle fracture, which may electrically disconnect pieces of the resultant fractured particles. As such, conventional disproportionated $SiO_x$ materials may exhibit a relatively short electrochemical cycle life and/or a relatively low reversible capacity, when applied as a lithium-ion battery anode. These deleterious features may prevent successful application of such materials in lithium-ion battery applications.

However, the present inventors have found that the turbostratic carbon of the envelope 110 operates to decrease the electrical resistivity of the primary particles 102 and also improves the cycle life and the first Coulombic efficiency of lithium-ion batteries including anodes that comprise the composite particles 100.

In particular, the turbostratic carbon of the envelope 110 may provide a flexible conductive network that is resilient to the expansion-contraction behavior of the primary particles 102 (e.g., of the crystalline Si and/or SiO included therein) during electrochemical cycling, which results in an increase in electrochemical cycle life. Therefore, the successful application of carbon materials, such as low-defect turbostratic carbon, to the surface of the primary particles 102 can overcome the deleterious features thought to be inherent to the disproportionation of $SiO_x$, and can enable this disproportionated silicon oxide material to be integrated into materials for use in lithium-ion battery applications.

In some embodiments, the primary particles 102 may optionally be metalized (e.g., metal-doped) to include additional metals and/or metal compounds (e.g., dopants) and/or precursors to further increase electrical conductivity, energy density, and/or electrical performance. For example, irreversible Li ion consumption may be additionally and/or alternatively controlled by metalizing (e.g., pre-doping) the primary particles 102 with Li ions, adding oxygen-sequestering metals to the primary particles 102, adding additional a source of supplemental lithium to an electrolyte, and/or by synthesizing the primary particles 102 comprising crystalline Si domains disposed in a matrix comprising $Li_xSiO_y$, through a bottom-up synthesis process.

For example, Li and/or Mg ions may be added to the primary particles 102 to form $M-SiO_x$ particles that include $Li_ySiO_x$ (where M is Li) and/or $Mg_ySiO_x$ phases (where M is Mg). In some embodiments, Li and/or Mg precursors may be added to the primary particles 102, which may then be thermally processed to generate metal silicate phases. In other embodiments, metals such as Mg, B, Ti, Fe, Al Cu, etc., may be added to the primary particles 102, in order to sequester reactive oxygen species released during initial charging by forming metal oxides. In some embodiments, the primary particles 102 may be synthesized by synthetic techniques, such as sol-gel synthesis techniques to generate a $Li_ySiO_x$ buffer matrix within the primary particles 102. In some embodiments, elements such as B, Li, N, etc., may be added to the primary particles 102 to increase electrical conductivity.

Methods

Figure 15B:
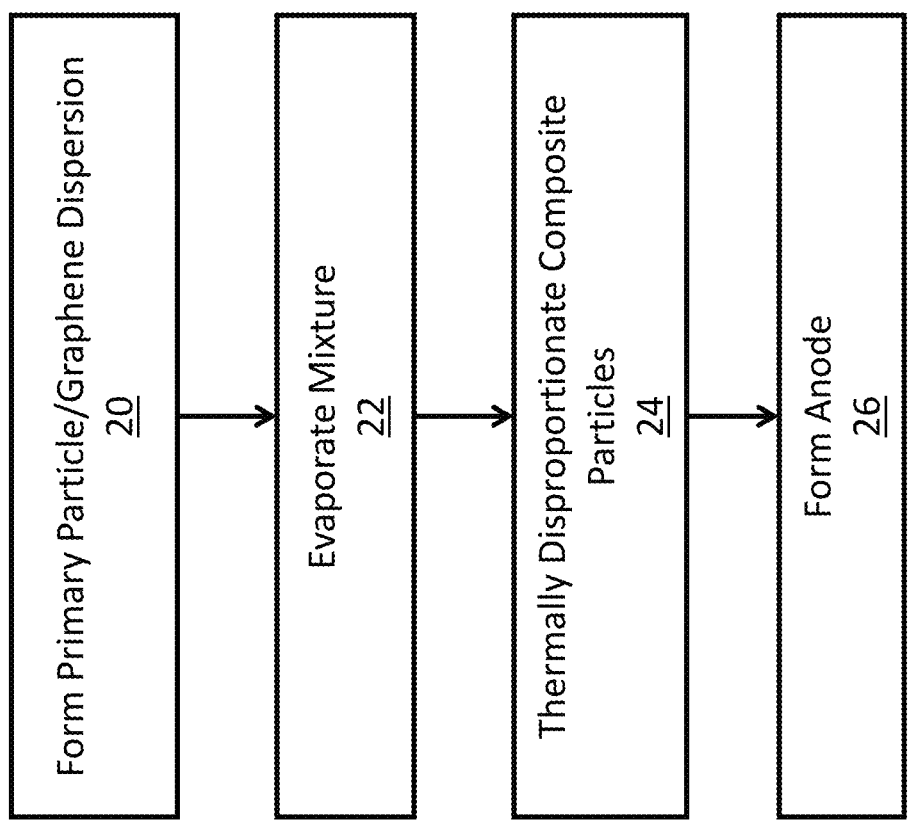
FIGS. 15A and 15B are block diagrams illustrating different methods of forming composite particles of FIGS. 14A and 14B, according to various embodiments of the present disclosure.
Figure 15A:
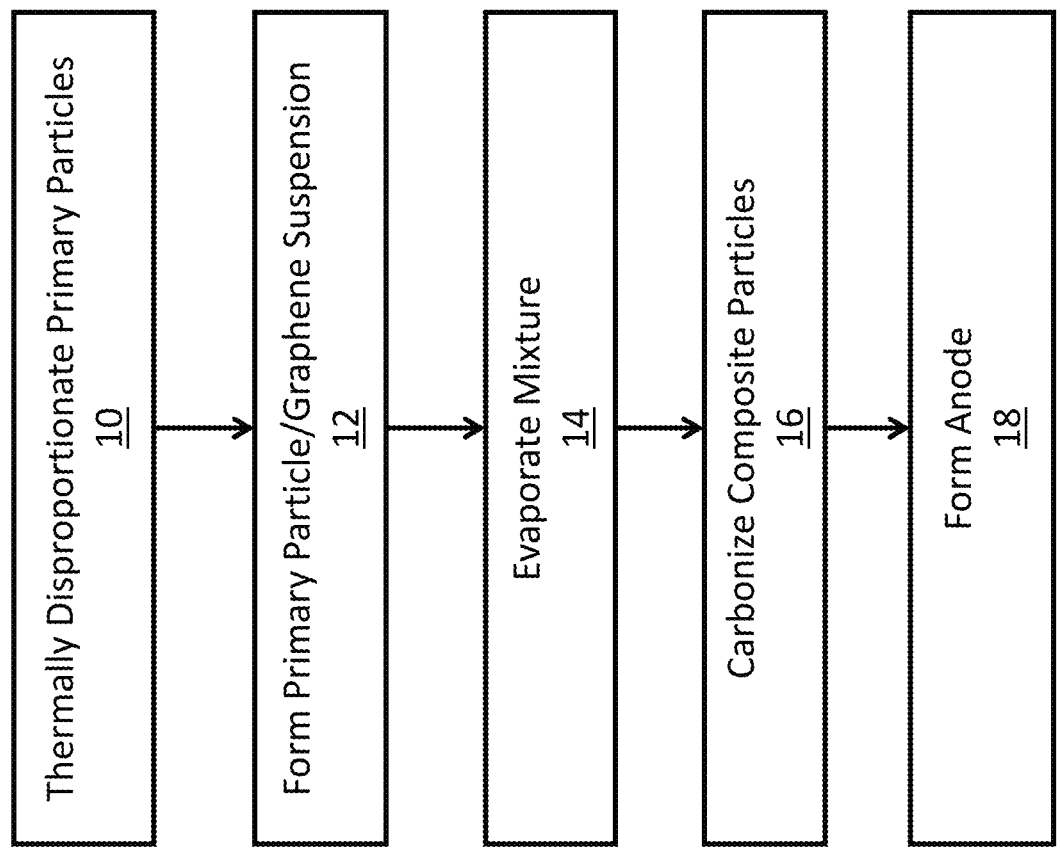

FIG. 15A is a block diagram illustrating a method of forming the composite particles of FIGS. 14A and 14B, according to various embodiments of the present disclosure. Referring to FIG. 15A, in step 10, the method may include heating primary particles comprising $SiO_x$, wherein x ranges from about 0.9 to about 1.6, such as from 0.9 to about 1.1, to thermally disproportionate the primary particles and form a silicon composite.

For example, the primary particles may be heated in an inert atmosphere (e.g., argon atmosphere), at a temperature ranging from about 600° C. to about 1400° C., such as a temperature ranging from about 950° C. to about 1200° C., or from about 1000° C. to about 1150° C. The heating may be performed for a time period ranging from about 30 minutes to about 4 hours, such as from about 1 hour to about 3.5 hours. The primary particles may have an average diameter ranging from about 0.5 µm to about 15 µm, in some embodiments.

The heat treatment process induces a thermal SiO disproportionation reaction forming disproportionated SiO comprising one or more electrochemically-active Si domains and one or more electrochemically-inactive $SiO_2$ domains within an amorphous electrochemically-active SiO matrix. Heat treatment is conducted in a furnace using an inert atmosphere at a temperature ranging from greater than 550° C. to less than 1400° C. depending on the Si crystallite size, size distribution and/or quantity desired and the particle size of the bulk silicon-based powder.

In step 12, the resultant disproportionated primary particles may then be suspended in water to create a uniform suspension. The suspension may then be mixed with an aqueous carbon suspension, at a pre-defined ratio, to create a uniform mixture of primary particles and carbon. The aqueous carbon suspension may include an organic dispersant and turbostratic carbon, such as turbostratic graphene. In some embodiments, the dispersion may be stabilized by mixing and/or sonication until the dispersion is visibly homogenous. In other embodiments, the aqueous carbon may include graphene, graphene oxide, partially reduced graphene oxide, or combinations thereof. The graphene-based material may further comprise a powder, particles, mono-layer sheets, multi-layer sheets, flakes, platelets, ribbons, quantum dots, tubes, fullerenes (hollow graphenic spheres) or combinations thereof.

In some embodiments, the mixture may include a primary particle to carbon weight ratio ranging from about 80:20 to about 98:02, such as from about 90:10 to about 95:05. The mixture may include a carbon to dispersant weight ratio ranging from about 3:1 to about 6:1.

In step 14, the stable mixture of primary particles and carbon may be processed such that the primary particles are coated with graphene. For example, the mixture may be dried using various processes, such as a spray-drying process as described above, to evaporate the water and create a powder comprising composite particles comprising disproportionated primary particles coated with carbon, e.g., turbostratic carbon, e.g., turbostratic graphene.

In various embodiments, step 12 may alternatively include forming a dry mixture comprising a carbon material (e.g., turbostratic graphene powder) and the disproportionated primary particles, and which does not include a liquid solvent. Step 14 may then alternately include adding a binding material to the mixture, followed by the application of a mechano-fusion process. In particular, the binding material may be physically mixed with the graphene powder and the active material particles, such that primary particles are coated with graphene using the binder, to form the composite particles. Non-limiting binding materials may include polymethyl methacrylate, polyethylene, polypropylene, polystyrene, polytetrafluoroethylene, polyvinylidene fluoride, polyethylene terephthalate, polyacrylonitrile, polydiallyldimethylammonium chloride, polyacrylic acid, lithiated polyacrylic acid (LiPAA), polysodium styrene sulfonate, polyvinylpyrrolidone, polyethylene glycol, polyethylene oxide, nylon, carboxymethyl cellulose, polysiloxanes, polyaramids, polyamides, polyimides, polyacrylates, polycarbonates, polyurethane, polyacetylene, polypyrrole, polyphenylene sulfuide, poly(3,4-ethylenedioxythiophene), poly(1,3-dioxolane), polyphenylene vinylene, polythiophene, polyaniline, polyfluorene, polypyrene, petroleum coke, coal tar pitch, carbon black, carbon nanotubes, sucrose, silica, indium tin oxide, aluminum-doped zinc oxide, lithium hydroxide, lithium acetate, lithium perchlorate, lithium fluoride, lithium nitride, lithium nitrate, lithium hexafluorophosphate, LiTFSI, LiFSI, NASICON, LISICON, LIPON, $Li_3PO_4$, $Li_7P_3S_{11}$, perovskites, garnets, polymerized ionic liquids, or any combinations thereof.

In other embodiments, step 12 may alternatively include forming a first mixture by dispersing the disproportionated active material particles in a liquid solvent, such as water or ethanol. A polyelectrolyte, such as polydiallyldimethylammonium chloride (PDDA), polyacrylic acid (PAA), or polysodium styrene sulfonate (PSS), may be added to the solvent before or after adding the active material particles to form a first surface charge on the active material particles and thereby stably suspend the active material particles in the solvent. A second mixture may be formed by dispersing a carbon material (e.g., turbostratic graphene powder) in a solvent such as water or ethanol. An oppositely-charged polyelectrolyte may be added to the solvent before or after adding the graphene to form a second surface charge on the graphene and thereby stably suspend the graphene in the solvent. The first and second surface charges may different ones of positive and negative charges.

Step 14 may then alternatively include forming a third mixture by combining the first and second mixtures such that the graphene is attracted to the surface of the active material particles, due to the difference in charge therebetween, thereby forming composite particles comprising graphene-coated active material particles. The polyelectrolytes on the graphene and active material particles may neutralize one another, such that the composite particles are substantially uncharged. Step 14 may further include drying the particles via an evaporation process or the like, to produce a powder comprising the composite particles.

In step 16, the resultant composite particles may be collected and subsequently subjected to a second heat treatment process at about 700° C., under inert gas, to carbonize and volatilize any of the organic graphene dispersant remaining on the composite particles.

In step 18, the method may optionally include forming an anode using the composite particles, as described above. Step 18 may also optionally include incorporating the anode into a Li-ion battery.

In some embodiments, the method may include further modification of the primary particles, either before or after step 10. For example, dopants and/or ion precursors may be added to the primary particles, and/or an additional heat-treatment step or chemical reaction may be performed.

FIG. 15B is a block diagram illustrating an alternative method of forming composite particles of FIGS. 14A and 14B, according to various embodiments of the present disclosure. Referring to FIG. 15B, in step 20, a mixture may be created as disclosed in step 12 of FIG. 15A, except that the mixture comprises non-disproportionated $SiO_x$ primary particles.

In step 22, the mixture may be processed to create composite particles comprising non-disproportionated $SiO_x$ primary particles coated with carbon, e.g., turbostratic graphene, as described in step 14 of FIG. 15A.

In step 24, the composite particles may be disposed in a furnace, such as a tube furnace, and heated to thermally disproportionate the primary particles. The heating parameters may be as described with respect to step 10 of FIG. 15A. Accordingly, the heating may also operate carbonize and volatilize any organic solvent remaining on the composite particles.

In step 26, the method may optionally include forming an anode using the composite particles, as described above. Step 26 may also optionally include incorporating the anode into a Li-ion battery.

In some embodiments, the method may include further modification of the primary particles, either before or after step 24. For example, dopants and/or ion precursors may be added to the primary particles, and/or an additional heat-treatment step or chemical reaction may be performed.

Accordingly, the composite particles formed by the methods of the present disclosure may include primary particles that are thermally disproportionated. As such, embodiments of the primary particles may each comprise active domains that can insert and extract Li+ ions, and a matrix in which the active domains are disposed and that includes inactive $SiO_2$ domains. The active silicon domains may be matched in size to the inactive $SiO_2$ domains and may occupy about 30 vol % of the particle. The remaining 70 vol % may contain active SiO domains that react with lithium upon initial charging to create active Si domains and inactive $Li_xSiO_y$ domains.

EXPERIMENTAL EXAMPLES

The following examples relate to anodes formed using anode active materials (e.g., composite particles) of various embodiments of the present disclosure and comparative anode active materials composite particles, and are given by way of illustration and not by way of limitation. In the examples, % is percent by weight, g is gram, and mAh/g is capacity.

Each anode was formed by combining 1.0 g of an anode active material (i.e., $SiO_x$, Graphene-$SiO_x$ composite, etc.) with 0.07 g conductive agent (Super-P carbon black, graphite, etc.), 0.266 g of lithium polyacrylate (LiPAA) binder, and 3.0 g of water in a planetary-like mixer with 60 minutes of rigorous mixing. The resulting anode slurry is coated on a copper foil with a loading of ~2.5 $mAh/cm^2$, and dried at 120° C. overnight. The electrodes were calendared to a porosity of 40%. Circular coupons with an area of 1.6 $cm^2$ were punched and assembled into half-cells using lithium metal as the counter electrode. The electrolyte comprised 1 M $LiPF_6$ in a mixture of EC:DMC (3:7) with 20% FEC. The cells were electrochemically "formed" under C/20, C/10, and C/5 charge-discharge cycles. The resulting half-cells were then characterized under a standard C/2 charge-discharge protocol until the anode capacity was 80% of its initial capacity.

Example: T1

Silicon oxide powder ($SiO_x$, x~0.9-1.1) from a first supplier was placed in a horizontal furnace where it was heated under inert gas at 1000° C. for 3 hours to enable the thermal disproportionation reaction. The thermally-treated powder was then dispersed into water at 1% concentration and further combined with an aqueous turbostratic graphene dispersion at 1% concentration. The ratio of the silicon oxide powder and graphene dispersion was kept at 95:05. The resultant mixture was then processed to create a graphene-$SiO_x$ composite powder. The composite powder was subsequently heated under inert gas at 700° C. for 1 hour. The resultant powder was analyzed by x-ray diffractometry and scanning electron microscopy. Anodes were prepared using the powder, and test cells were constructed and cycled, as discussed above.

Example: T2

Silicon oxide powder ($SiO_x$, x~0.9-1.1) from the first supplier was placed in a horizontal furnace where it was heated under inert gas at 1050° C. for 3 hours to enable the thermal disproportionation reaction. The thermally-treated powder was then dispersed into water at 1% concentration and further combined with an aqueous turbostratic graphene dispersion at 1% concentration. The ratio of the silicon oxide powder and graphene dispersion was kept at 95:05. The resultant mixture was then processed to create a graphene-$SiO_x$ composite powder. The composite powder was subsequently heated under inert gas at 700° C. for 1 hour. The resultant powder was analyzed by x-ray diffractometry and scanning electron microscopy. Anodes were prepared using the powder, and test cells were constructed and cycled, as discussed above.

Example: T3

Silicon oxide powder ($SiO_x$, x~0.9-1.1) from the first supplier was placed in a horizontal furnace where it was heated under inert gas at 1100° C. for 3 hours to enable the thermal disproportionation reaction. The thermally-treated powder was then dispersed into water at 1% concentration and further combined with an aqueous turbostratic graphene dispersion at 1% concentration. The ratio of the silicon oxide powder and graphene dispersion was kept at 95:05. The resultant mixture was then processed to create a graphene-$SiO_x$ composite powder. The composite powder was subsequently heated under inert gas at 700° C. for 1 hour. The resultant powder was analyzed by x-ray diffractometry and scanning electron microscopy. Anodes were prepared using the powder, and test cells were constructed and cycled, as discussed above.

Example: T3-B

Silicon oxide powder ($SiO_x$, x~0.9-1.1) from the first supplier was dispersed into water at 1% concentration and combined with an aqueous turbostratic graphene dispersion at 1% concentration. The ratio of the silicon oxide powder and graphene dispersion was kept at 95:05. The resultant mixture was then processed to create a graphene-$SiO_x$ composite powder. The composite powder was subsequently heated under inert gas at 1100° C. for 3 hours. The resultant powder was analyzed by x-ray diffractometry and scanning electron microscopy. Anodes were prepared using the powder, and test cells were constructed and cycled, as discussed above.

Example: NoG-1

Silicon oxide powder ($SiO_x$, x~0.9-1.1) from the first supplier was used to construct anode electrodes using the electrode formulation described above, without including graphene.

Electrochemical cells including the anodes were prepared and cycled as discussed above.

Example: Control 1

Silicon oxide powder ($SiO_x$, x~0.9-1.1) from the first supplier was dispersed into water at 1% concentration and combined with an aqueous turbostratic graphene dispersion at 1% concentration. The ratio of the silicon oxide powder and graphene dispersion was kept at 95:05. The resultant mixture was then processed to create a graphene-$SiO_x$ composite powder. The composite powder was subsequently heated under inert gas at 700° C. for 1 hour, without disproportionating $SiO_x$. The resultant powder was analyzed by x-ray diffractometry and scanning electron microscopy. Anodes were prepared using the powder, and test cells were constructed and cycled, as discussed above.

Example: Control 2

Silicon oxide powder ($SiO_x$, x~0.9-1.1) from the first supplier was dispersed into water at 1% concentration and combined with an aqueous turbostratic graphene dispersion at 1% concentration. The ratio of the silicon oxide powder and graphene dispersion was kept at 90:10. The resultant mixture was then processed to create a graphene-$SiO_x$ composite powder. The composite powder was subsequently heated under inert gas at 700° C. for 1 hour, without disproportionating $SiO_x$. The resultant powder was analyzed by x-ray diffractometry and scanning electron microscopy. Anodes were prepared using the powder, and test cells were constructed and cycled, as discussed above.

Example: Comparative

Silicon oxide powder ($SiO_x$, x~0.9-1.1) from the first supplier was placed in a horizontal furnace where it was heated under inert gas at 1100° C. for 3 hours to enable the thermal disproportionation reaction. The powder thus obtained was analyzed by x-ray diffractometry, scanning electron microscopy, and electrochemical cell cycling. The material was not mixed with graphene or composited. Anodes were prepared using the powder, and test cells were constructed and cycled, as discussed above.

Example: NoG-2

Amorphous carbon coated silicon oxide powder (C—$SiO_x$, x~0.9-1.1) from the first supplier was used to construct anode electrodes using the electrode formulation described above. The material was not mixed with graphene or composited. Electrochemical cells including the anodes were prepared and cycled as discussed above.

Example: Control 3

Amorphous carbon coated silicon oxide powder (C—$SiO_x$, x~0.9-1.1) from the first supplier was dispersed into water at 1% concentration and combined with an aqueous graphene dispersion at 1% concentration. The ratio of the silicon oxide powder and graphene dispersion was kept at 90:10. The resultant mixture was then processed to create a graphene and amorphous carbon coated $SiO_x$ composite powder. The composite powder was subsequently heated under inert gas at 700° C. for 1 hour, without disproportionating $SiO_x$. The resultant powder was analyzed by x-ray diffractometry and scanning electron microscopy. Anodes were prepared using the powder and test cells were constructed and cycled, as discussed above.

Example: T4

Amorphous carbon coated silicon oxide powder (C—$SiO_x$, x~0.9-1.1) from the first supplier was placed in a horizontal furnace where it was heated under inert gas at 1050° C. for 3 hours to enable the thermal disproportionation reaction. The thermally-treated powder was then dispersed into water at 1% concentration and further combined with an aqueous turbostratic graphene dispersion at 1% concentration. The ratio of the silicon oxide powder and graphene dispersion was kept at 95:05. The resultant mixture was then processed to create a graphene-$SiO_x$ composite powder. The composite powder was subsequently heated under inert gas at 700° C. for 1 hour. The resultant powder was analyzed by x-ray diffractometry and scanning electron microscopy. Anodes were prepared using the powder, and test cells were constructed and cycled, as discussed above.

Example: T5

Example T5 was the same as Example T4, except that the temperature of the horizontal furnace was increased to 1100° C.

Example: T6

Example T6 was the same as Example T4, except that Example T6 was thermally disproportionated at 1175° C.

Example: NoG-3

Example NoG-3 was the same as Example NoG-1, except for using silicon oxide powder ($SiO_x$, x~0.9-1.1) from a second supplier as the starting material.

Example: Control-4

Example Control-4 was the same as Example Control-2, except for using silicon oxide powder $SiO_x$, x~0.9-1.1) from the second supplier as the starting material.

Example: Control-5

Example Control-5 was the same as Example Control-4, except for applying a 20 wt % graphene coating to the starting material.

Examples: T7 and T8

Examples T7 and T8 were the same as Example Control-5, except that Example T7 was disproportionated at 1000° C., and Example T8 was disproportionated at 1100° C.

Example: NoG-4

Example NoG-4 was the same as Example NoG-2, except for using amorphous carbon coated silicon oxide powder ($SiO_x$, x~0.9-1.1) from the second supplier as the starting material.

Control-6

Example Control-6 was the same as Example Control 3, except for using amorphous carbon coated silicon oxide powder ($SiO_x$, x~0.9-1.1) from the second supplier as the starting material.

Examples T9, T10, T11

Examples T9, T10, and T11 were the same as Example Control-6, except that Example T9 was thermally disproportionated at 1100° C., Example T10 was thermally disproportionated at 1120° C., and Example T11 was thermally disproportionated at 1140° C.

The following Table 2 includes the physical and electrochemical characteristics of the above examples.

TABLE 2

| Example | Starting Material | Thermal Dispro. Reaction T (C) | Si (111) Crystallite Size (nm) | Graphene Content (wt %) | $1^{st}$ Lithiation Capacity (mAh/g) | $1^{st}$ Delithiation Capacity (mAh/g) | $1^{st}$ cycle Coulombic Efficiency (%) |
|---|---|---|---|---|---|---|---|
| Group 1 | | | | | | | |
| NoG-1 | $SiO_x$ | N/A | — | 0 | 2385 | 1509 | 63.3% |
| Control-1 | $SiO_x$ | N/A | — | 5 | 2140 | 1559 | 72.9% |
| Control-2 | $SiO_x$ | N/A | — | 10 | 1826 | 1298 | 71.1% |
| T1 | $SiO_x$ | 1000 | ~5 | 5 | 1928 | 1412 | 73.2% |
| T2 | $SiO_x$ | 1050 | ~6 | 5 | 1726 | 1286 | 74.5% |

TABLE 2-continued

| Example | Starting Material | Thermal Dispro. Reaction T (C) | Si (111) Crystallite Size (nm) | Graphene Content (wt %) | 1st Lithiation Capacity (mAh/g) | 1st Delithiation Capacity (mAh/g) | 1st cycle Coulombic Efficiency (%) |
|---|---|---|---|---|---|---|---|
| T3 | SiO$_x$ | 1100 | ~8 | 5 | 1684 | 1282 | 76.1% |
| T3-B | SiO$_x$ | 1100 | ~8 | 5 | 1591 | 1212 | 76.2% |
| Comparative | SiO$_x$ | 1100 | ~8 | 0 | 38 | 12 | 31.6% |
| Group 2 | | | | | | | |
| NoG-2 | C—SiO$_x$ | N/A | — | 0 | 2419 | 1770 | 73.2 |
| Control-3 | C—SiO$_x$ | N/A | — | 5 | 1838 | 1349 | 73.4 |
| T4 | C—SiO$_x$ | 1050 | ~6 | 5 | 1917 | 1420 | 74.1 |
| T5 | C—SiO$_x$ | 1100 | ~8 | 5 | 1810 | 1364 | 75.4 |
| T6 | C—SiO$_x$ | 1175 | ~13 | 5 | 153 | 58 | 37.9 |
| Group 3 | | | | | | | |
| NoG-3 | SiO$_x$ | N/A | — | 0 | 2039 | 1314 | 64.4 |
| Control-4 | SiO$_x$ | N/A | — | 10 | 2011 | 1454 | 72.3 |
| Control-5 | SiO$_x$ | N/A | — | 20 | 1922 | 1347 | 70.1 |
| T7 | SiO$_x$ | 1000 | — | 20 | 1615 | 1156 | 71.6 |
| T8 | SiO$_x$ | 1100 | — | 20 | 1460 | 1095 | 75.0 |
| Group 4 | | | | | | | |
| NoG-4 | C—SiO$_x$ | N/A | — | 0 | 1842 | 1411 | 76.6 |
| Control-6 | C—SiO$_x$ | N/A | — | 5 | 1762 | 1342 | 76.2 |
| T9 | C—SiO$_x$ | 1100 | — | 5 | 1677 | 1320 | 78.7 |
| T10 | C—SiO$_x$ | 1120 | — | 5 | 1591 | 1228 | 77.2 |
| T11 | C—SiO$_x$ | 1140 | — | 5 | 1491 | 1156 | 77.5 |

As can be seen in Group 1 of Table 2, the Comparative Example, which included a SiO$_x$ material that was thermally-treated at 1100° C. but did not include a graphene coating, experienced high electrical resistance and a corresponding low lithiation capacity of 38 mAh/g, a low delithiation capacity of 12 mAh/g, and a 1$^{st}$ cycle Coulombic efficiency of only 31.6%. It is believe that Example T6 performed poorly most likely due to high resistance surface layers (SiO$_2$) that formed due to the higher reaction temperature, which essentially prevents lithium ions and electrons from passing through the material fast enough and results in the voltage of the cell reaching a safety limit and prevents complete reaction of the material with lithium ions and electrons.

In comparison, Example T3, which included graphene covering the same thermally-treated SiO$_x$ material, was able to maintain sufficient electrical conductivity to achieve a lithiation capacity of 1684 mAh/g, a delithiation capacity of 1282 mAh/g, and a 1$^{st}$ cycle Coulombic efficiency of 76.1%. Further, Example T9, which included thermally disproportionated SiO$_x$ covered with amorphous carbon and turbostratic graphene, exhibited an unexpectedly high 1$^{st}$ cycle Coulombic efficiency of 78.7%.

Thus, the exemplary materials provided improved results compared to the NOG materials which were not disproportionated and not covered with graphene, the Control Examples, which were not disproportionated but covered in graphene, and the Comparative Example, which was disproportionated but not covered with graphene. The exemplary materials provide a first cycle lithiation capacity of at least 1450 mAh/g, e.g., 1850-1930 mAh/g, a first cycle de-lithiation capacity of at least 1090 mAh/g, e.g., 1200-1320 mAh/g, and a first cycle Coulombic efficiency of at least 70%, i.e., 76.0 to 78.9%.

Also noticeable is the extremely low 1$^{st}$ cycle lithiation/delithiation capacities and 1$^{st}$ cycle Coulombic efficiency (only 31.6%) of the Comparative Example, which is a test sample having SiO$_x$ powder that was heat treated at 1100° C. for 3 hours. Comparing Example 8 (Comparative) and Example 1, which is the NoG-1 test sample having SiO$_x$ powder that was not heat treated, the data show that the NoG-1 test sample has significantly higher 1$^{st}$ cycle lithiation/delithiation capacities than the Comparative test sample, and the coulombic efficiency of the NoG-1 test sample also exhibited a 1$^{st}$ cycle coulombic efficiency about 2× higher (63.3%) than the coulombic efficiency of the Comparative test sample. This data show that heat treating the SiO$_x$ to form dpp-SiO has a dramatic unfavorable impact on 1$^{st}$ cycle performance, demonstrating a strong resistance to Li$^+$ insertion. The strong resistance to Li$^+$ insertion is likely due to the formation of electrochemically-inactive SiO$_2$ domains within the dpp-SiO during heat treating.

With regard to Group 2 of Table 2, noticeable is that the data for these samples follow the same outcomes described above for their similarly processed counterparts, namely, that i) the addition of graphene to the SiO$_x$ increases 1$^{st}$ cycle coulombic efficiency, ii) heat treatment of the SiO$_x$ increases 1$^{st}$ cycle coulombic efficiency when graphene is part of the heterogeneous composite particle structure, and iii) increasing disproportion reaction temperature increases 1$^{st}$ cycle coulombic efficiency, but decreases 1$^{st}$ cycle lithiation/delithiation capacities.

With regard to Groups 1 and 2 of Table 2, comparing the No-G data with the Control data, where the No-G data has no graphene and the Control data has 5 wt % graphene, and where the silicon-based material in both groups have not been heat treated, the data indicate that carbon coating increases 1$^{st}$ cycle coulombic efficiency of the both the NoG and the Control powders. This data validates previous researchers findings that carbon coated silicon-based powder can improve both 1$^{st}$ cycle coulombic efficiency and 1$^{st}$ cycle lithiation/delithiation capacities. However, when the silicon-based material is heat treated to form dpp-SiO, the data shows that the carbon coating provides no added value to 1$^{st}$ cycle coulombic efficiency. In fact, the data for both test cell pairs indicate a decrease in coulombic efficiency in the electrodes using powder comprising carbon coated dpp-SiO cores. Moreover, the data further shows that 1$^{st}$ cycle coulombic efficiency increases with increasing heat treatment temperature without dramatically unfavorably affecting 1$^{st}$ cycle lithiation/delithiation capacities.

In summary, the above examples demonstrate that the heterogeneous composite particles of the present application comprising dpp-SiO and graphene provide composite silicon-based electrodes with decreased irreversible active ion reactions, lower resistance to lithium ion insertion, higher electrical conductivity and increased first cycle efficiency without detriment to 1$^{st}$ cycle lithiation/delithiation. Graphene as part of the particle structure augments the electrical conductivity of the electrode while providing microporosity to the surface of the particles of the electrode thereby decreasing charge-transfer resistance. The SiO$_x$ heat treatment induces a thermal disproportionation reaction to decrease the amount of SiO available to irreversibly react with Lit ions, which, in turn, increases 1$^{st}$ cycle coulombic efficiency and extends battery cycling life.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of forming an anode material, the method comprising:
   thermally disproportionating SiO$_x$ particles, wherein x ranges from about 0.9 to about 1.1, to form primary particles comprising crystalline Si domains disposed in a matrix comprising SiO$_2$;
   forming a mixture comprising the primary particles and carbon; and
   processing the mixture to form composite particles, each composite particle comprising:
      one of the primary particles; and
      an envelope disposed on the primary particle and comprising at least 90 wt % turbostratic graphene having a Raman spectrum having:
         a D band having a peak intensity ($I_D$) at wave number between 1330 cm$^{-1}$ and 1360 cm$^{-1}$;
         a G band having a peak intensity ($I_G$); and
         a 2D band having a peak intensity ($I_{2D}$) at wave number between 2650 cm$^{-1}$ and 2750 cm$^{-1}$,
      wherein:
         a ratio of $I_D/I_G$ ranges from greater than zero to about 0.9; and
         a ratio of $I_{2D}/I_G$ ranges from about 0.5 to about 2.

2. The method of claim 1, wherein:
   the thermally disproportionating comprises heating the SiO$_x$ particles at a temperature ranging from about 1050° C. to about 1150° C., in an inert atmosphere; and
   the processing the mixture comprises spray-drying the mixture.

3. The method of claim 1, further comprising carbonizing the composite particles.

4. The method of claim 1, further comprising adding a metal dopant or dopant precursor to the primary particles, either before or after the thermal disproportionation of the SiO$_x$ particles.

5. A method of forming an anode material, the method comprising:
   forming a mixture comprising SiO$_x$ particles, wherein x ranges from about 0.7 to about 1.1, and carbon;
   processing the mixture form a powder; and
   thermally disproportionating the powder to form composite particles, each of the composite particles comprising:
      a primary particle comprising crystalline Si domains disposed in a matrix comprising SiO$_2$; and
      an envelope disposed on the primary particle and comprising at least 90 wt % turbostratic graphene having a Raman spectrum having:
         a D band having a peak intensity ($I_D$) at wave number between 1330 cm$^{-1}$ and 1360 cm$^{-1}$;
         a G band having a peak intensity ($I_G$); and
         a 2D band having a peak intensity ($I_{2D}$) at wave number between 2650 cm$^{-1}$ and 2750 cm$^{-1}$,
      wherein:
         a ratio of $I_D/I_G$ ranges from greater than zero to about 0.9; and
         a ratio of $I_{2D}/I_G$ ranges from about 0.5 to about 2.

6. The method of claim 5, further comprising carbonizing the composite particles.

7. The method of claim 5, wherein:
   the thermally disproportionating comprises heating the composite particles at a temperature ranging from about 1050° C. to about 1150° C., in an inert atmosphere; and
   the processing the mixture comprises spray-drying the mixture.

8. The method of claim 5, further comprising adding a metal dopant or dopant precursor to the primary particles, either before or after the thermal disproportionation of the composite particles.

* * * * *